(12) United States Patent
Zhang

(10) Patent No.: US 12,494,633 B2
(45) Date of Patent: Dec. 9, 2025

(54) SOLID STATE CIRCUIT BREAKER DEVICE AND METHOD WITHOUT CURRENT LIMITER

(71) Applicant: THE UNITED STATES OF AMERICA, AS REPRESENTED BY THE SECRETARY OF THE NAVY, Arlington, VA (US)

(72) Inventor: Di Zhang, Carmel, CA (US)

(73) Assignee: The Government of the United States of America, as represented by the Secretary of the Navy, Alington, VA (US)

( * ) Notice: Subject to any disclaimer, the term of this patent is extended or adjusted under 35 U.S.C. 154(b) by 463 days.

(21) Appl. No.: 18/114,655

(22) Filed: Feb. 27, 2023

(65) Prior Publication Data

US 2023/0261462 A1    Aug. 17, 2023

Related U.S. Application Data

(60) Provisional application No. 63/313,958, filed on Feb. 25, 2022.

(51) Int. Cl.
*H02H 9/00* (2006.01)
*H02H 9/02* (2006.01)

(52) U.S. Cl.
CPC .................. *H02H 9/02* (2013.01)

(58) Field of Classification Search
IPC ....................................................... H02H 9/02
See application file for complete search history.

(56) References Cited

U.S. PATENT DOCUMENTS

| | | | | |
|---|---|---|---|---|
| 11,888,312 | B2* | 1/2024 | Zhang | H01C 7/108 |
| 12,148,590 | B2* | 11/2024 | Rodrigues | H10D 18/80 |
| 12,183,134 | B2* | 12/2024 | Dong | G06F 9/4401 |
| 2016/0079401 | A1* | 3/2016 | Zhang | H10D 12/411 |
| | | | | 361/57 |
| 2022/0085600 | A1* | 3/2022 | Qi | H02H 3/08 |

OTHER PUBLICATIONS

R. J.C. Bowman and A. Jankovsky, "Sizing power components of an electrically driven tail cone thruster and a range extender," in Proc. 1/16 AIAA Aviation Technol. Integr. Oper. Conf, 2016, pp. 1-9.

(Continued)

*Primary Examiner* — Stephen W Jackson
(74) *Attorney, Agent, or Firm* — Heber Martin Carbajal; Scott Bell

(57) ABSTRACT

A Solid-State Circuit Breaker Device and Method Without Current Limiting Inductor. According to an exemplary embodiment of this disclosure, described is a high-density, high-efficiency megawatt (MW) medium-voltage (MV) solid-state circuit breaker (SSCB) for, example only, aviation hybrid electric propulsion applications. The SSCB is based on the mature silicon (Si) insulated gate bipolar transistor (IGBT) devices. With reduced IGBT gate voltage, the disclosed SSCB can limit the peak fault current without the fault current limiting inductor. Thus, the specific power density of the SSCB is substantially improved compared with the traditional design.

20 Claims, 20 Drawing Sheets

(56) References Cited

OTHER PUBLICATIONS

M. Kempkes, I. Roth, and M. Gaudreau, "Solid-state circuit breakers for medium voltage de power," in Proc. IEEE Electric Ship Technol. Symp., 2011, pp. 254-257.

Rostan Rodrigues, Yu Du, Antonello Antoniazzi and Piet:J. o Cairoli "A Review of Solid-State Circuit Breakers," in IEEE Transactions on Power Electronics, vol. 36, No. 1, pp. 364-377, Jan. 2021.

Infineon, "IHM-B module with Trench/Fieldstop IGBT4 and Emitter Controlled 4 diode," FZ1400R33HE4 datasheet version 2.0, Oct. 2019.

Di Zhang, Jiangbiao He and Di Pan, "A Megawatt-Scale Medium-Voltage High Efficiency High Power Density "SiC+Si" Hybrid Three-Level ANPC Invelter for Aircraft Hyb1id-Elect1ic Propulsion Systems," in IEEE Transactions on Industry Applications, vol. 55, No. 6, pp. 5971-5980, Nov.-Dec. 2019.

\* cited by examiner

SOLID STATE CIRCUIT BREAKER DEVICE AND METHOD WITHOUT CURRENT LIMITER

CROSS REFERENCE TO RELATED PATENT(S) AND APPLICATION(S)

This application claims the benefit of U.S. Provisional Application No. 63/313,958, filed Feb. 25, 2022, and entitled Solid-State Circuit Breaker Without Current Limiting Inductor, which is hereby incorporated in its entirety by reference.

BACKGROUND

This disclosure, and the exemplary embodiments described herein, describe devices and methods for a Solid-State Circuit Breaker Without a Current Limiting Inductor. According to an exemplary embodiment, described is a high-density, high-efficiency megawatt (MW) medium-voltage (MV) solid-state circuit breaker (SSCB) for aviation hybrid electric propulsion applications, however it is to be understood that the scope of this disclosure is not limited to such application. The SSCB is based on the mature silicon (Si) insulated gate bipolar transistor (IGBT) devices. With reduced IGBT gate voltage, the disclosed SSCB can limit the peak fault current without the fault current limiting inductor. Thus, the specific power density of the SSCB is substantially improved compared with the traditional design.

Hybrid electric propulsion is a promising solution to improving fuel burn efficiency and reducing carbon emission for aviation applications in the near future. The power rating of the electrical power system to support hybrid electric propulsion is in the range of megawatts (MW) to tens of MW. Thus, to reduce the total weight of the electric power system, especially the cable weight, the medium-voltage direct current (MVDC) system is selected due to its numerous advantages compared with the traditional alternating current (AC) system.

As in other MVDC applications, hybrid electric propulsion needs protection devices to handle the system short circuit fault. Although the mechanical breaker and hybrid circuit breaker have such benefits as low conduction loss, the solid-state circuit breaker (SSCB) is more desirable mainly due to its superfast response, arc free operation and simple structure. However, the aviation hybrid electric propulsion imposes strict requirements on the specific power of SSCB. For example, a 100 kW/kg is targeted for SSCB to make the hybrid electric propulsion feasible for aviation applications.

The traditional SSCB design mainly consists of the semiconductor switches, the voltage clamping circuit and the fault current limiting device. Due to low impedance in the MVDC system, the short-circuit fault can cause transient current with fast rising speed measured as di/dt. To limit the dc fault current and gain more time for the fault detection and clearance circuit, the traditional fault current limiting device is a directly installed inductor. Such a method is simple and robust. However, to limit the current rising speed under full dc bus voltage, carry full system current continuously and further handle a transient peak fault current without saturation, such a fault current limiting inductor is very heavy. To meet the specific power target of 100 kW/kg, it would be of necessity to eliminate the current limiting inductor from SSCB while keeping the same current limiting capability.

Extensive studies conducted on SSCB have been performed. [Ref. 1]. Most of the research focused on the power semiconductor technologies, circuit topology, voltage clamping circuit, gate driver and fault sense and trip electronic circuit. However, the method to eliminate the current limiting inductor is not covered. Most recent studies on SSCB continue to concentrate on the forementioned topics. In these studies, either a fault current limiting inductor is involved, or sufficient system inductance is assumed to limit the fault current rising speed and peak value. For applications where the system inductance is high enough, the fault current limiting inductor can be optional. However, in applications where the breaker is connected directly to a low-impedance source (e.g., a battery or capacitor bank), when a short circuit occurs directly across the output terminals, the fault current limiting device is needed. In hybrid electric propulsion, the battery can be the main or auxiliary source and rectifiers' dc capacitors can be connected to the dc bus directly, so the breaker design cannot depend on the assumption that a high system impedance is always present to limit the fault current.

Air-core transformer have been disclosed as a fault current limiter, as well as the use of a transformer or coupled magnetic components to limit the fault current. In spite of potentially better performance than the traditional inductor, they, as magnetic components, are not substantially lighter than inductors.

It is well-known that the silicon (Si) insulated gate bipolar transistor (IGBT) short circuit current can be limited by reducing the gate voltage. However, no known research has leveraged this IGBT characteristic to eliminate the current limiting inductor inside an SSCB for high specific power which is critical for aviation applications. This disclosure proposes to use the IGBT with reduced gate voltage to limit the peak fault current regardless of the system impedance. The disclosed solution does not involve any additional fault current limiting device. The current limiting function is integrated into the semiconductor device without weight penalty. With the current limiting inductor eliminated, the 100 kW/kg specific power target of SSCB becomes feasible. Also, with the disclosed solution, the peak fault current is independent of the fault detection and response time. Thus, a slower response time can be implemented. This simplifies the control system design and improves the immunity to system noise during normal operation. This also brings in additional design freedom for mechanical layout optimization to reduce weight/volume and to meet insulation requirement at high altitude which is another critical metric for the hybrid electric propulsion system. The downside of the disclosed solution is higher conduction loss in IGBT under the normal operating conditions, higher thermal stress inside IGBT during fault transients and some new design issues related to the extremely high fault current ramping rate. However, the analysis and test results presented herein clearly prove that the penalty and risks are negligible compared with the benefits of the disclosed solution.

INCORPORATION BY REFERENCE

The following publications are incorporated by reference in their entirety.

[Ref. 1] R. Rodrigues, Y. Du, A. Antoniazzi and P. Cairoli "A Review of Solid-State Circuit Breakers," in *IEEE Transactions on Power Electronics*, vol. 36, no. 1, pp. 364-377, January 2021.

[Ref. 2] D. Zhang, J. He and D. Pan, "A Megawatt-Scale Medium-Voltage High Efficiency High Power Density "SiC+Si" Hybrid Three-Level ANPC Inverter for Aircraft Hybrid-Electric Propulsion Systems," in *IEEE Transac-* tions on *Industry Applications*, vol. 55, no. 6, pp. 5971-5980, November-December 2019.

[Ref. 3] S. Mohsenzade, M. Zarghani and S. Kaboli, "A Series Stacked IGBT Switch to Be Used as a Fault Current Limiter in HV High-Power Supplies," in *IEEE Journal of Emerging and Selected Topics in Power Electronics*, vol. 9, no. 5, pp. 6300-6314, October 2021.

[Ref. 5] S. Lefebvre, Z. Khatir and F. Saint-Eve, "Experimental behavior of single-chip IGBT and COOLMOS devices under repetitive short-circuit conditions," in IEEE Transactions on Electron Devices, vol. 52, no. 2, pp. 276-283, February 2005.

[Ref. 6] D. Qin, Z. Zhang, D. Zhang, Y. Xu, R. Lakshmi, S. Tohid, D. Dong and Y. Cao, "Analysis and Suppression of Voltage Oscillation of Solid-state Circuit Breaker Entering Active Region", in *IEEE ECCE* 2022.

[Ref. 7] L. Ravi, D. Zhang, D. Qin, Z. Zhang, Y. Xu and D. Dong, "Electronic MOV-Based Voltage Clamping Circuit for DC Solid-State Circuit Breaker Applications", in *IEEE Transactions on Power Electronics*, vol. 37, no. 7, pp. 7261-7565, July 2022.

[Ref. 8] D. Zhang, Y. Xu, J. Brandt, Z. Zhang, D. Qin and D. Dong, "A Solid-State Circuit Breaker without Current Limiting Inductor," 2022 IEEE Energy Conversion Congress and Exposition (ECCE), Detroit, MI, USA, 2022, pp. 1-7, doi: 10.1109/ECCE50734.2022.9948197.

Additional Listing of References Cited and Not Incorporated by Reference: [Ref. 4] FZ1500R33HL3 datasheet, infineon.com.

BRIEF DESCRIPTION

In accordance with one exemplary embodiment of the present disclosure, disclosed is a solid state circuit breaker (SSCB) comprising: a first IGBT (Insulated Gate Bipolar Transistor), the first IGBT including an emitter, a collector, and a gate; a second IGBT that is anti-series to the first IGBT, the second IGBT including an emitter, a collector, and a gate; each IGBT including anti-parallel diodes to carry and break bi-directional currents; and a voltage clamping circuit or device to clamp the peak voltage across the first and second anti-series IGBTs, wherein the first IGBT gate and the second IGBT gate are driven with a gate driver which applies a gate voltage to each gate which normally operates the IGBTs within the saturation region or turns the IGBTs off, and the applied gate voltage acts to limit the current thru the IGBT to the saturation current of the IGBT in the event the IGBT enters an active region during a current overload fault mode, the gate voltage applied enabling the IGBTs to operate as a solid state circuit breaker without a current limiting inductor.

In accordance with another exemplary embodiment of the present disclosure, disclosed is a solid state circuit breaker (SSCB) comprising: a first SSCB and a second SSB, each SSCB configured to operatively connect to a distinct pole of a voltage source, and each SSBC including: a first IGBT (Insulated Gate Bipolar Transistor), the first IGBT including an emitter, a collector, and a gate; a second IGBT that is anti-series to the first IGBT, the second IGBT including an emitter, a collector, and a gate; each IGBT including anti-parallel diodes to carry and break bi-directional currents; and a voltage clamping circuit or device to clamp the peak voltage across the first and second anti-series IGBTs, wherein the first IGBT gate and the second IGBT gate are driven with a gate driver which applies a gate voltage to each gate which normally operates the IGBTs within the saturation region or turns the IGBTs off, and the applied gate voltage acts to limit the current thru the IGBT to the saturation current of the IGBT in the event the IGBT enters an active region during a current overload fault mode, the gate voltage applied enabling the IGBTs to operate as a solid state circuit breaker without a current limiting inductor.

In accordance with another exemplary embodiment of the present disclosure, disclosed is a method of operating a solid state circuit breaker (SSCB) to provide current limiting without a current limiting inductor, the SSCB including a first IGBT (Insulated Gate Bipolar Transistor) and second anti-series IGBT, each IGBT including anti-parallel diodes to carry and break bi-directional currents; and a voltage clamping circuit or device to clamp the peak voltage across the first and second anti-series IGBTs, the method comprising: applying to the first IGBT gate and the second IGBT a gate voltage which normally operates the IGBTs within the saturation region or turns the IGBTs off, and the applied gate voltage acting to limit the current thru the IGBT to the saturation current of the IGBT in the event the IGBT enters an active region during a current overload fault mode, the gate voltage applied enabling the IGBTs to operate as a solid state circuit breaker without a current limiting inductor.

BRIEF DESCRIPTION OF THE DRAWINGS

For a more complete understanding of the present disclosure, reference is now made to the following descriptions taken in conjunction with the accompanying drawings.

DETAILED DESCRIPTION

This disclosure, and the exemplary embodiments described herein, describe devices and methods for a Solid- State Circuit Breaker Without a Current Limiting Inductor. According to an exemplary embodiment, described is a high-density, high-efficiency megawatt (MW) medium-voltage (MV) solid-state circuit breaker (SSCB) for aviation hybrid electric propulsion applications, however it is to be understood that the scope of this disclosure is not limited to such application. The SSCB is based on the mature silicon (Si) insulated gate bipolar transistor (IGBT) devices. With reduced IGBT gate voltage, the disclosed SSCB can limit the peak fault current without the fault current limiting inductor. Thus, the specific power density of the SSCB is substantially improved compared with the traditional design.

This disclosure is organized as follows: Section I presents the operation principle of the disclosed SSCB in an example system. The benefits and penalties are discussed in section II. Section III focuses on one challenge due to the super-high current rising speed and the corresponding solution. All the analysis and feasibility of the disclosed solution, an exemplary embodiments provided, are verified with experimental results in Section IV, followed by conclusions in Section V.

I. OPERATION PRINCIPLE OF THE DISCLOSED SOLID-STATE CIRCUIT BREAKER

A. Traditional Design

Figure 1:
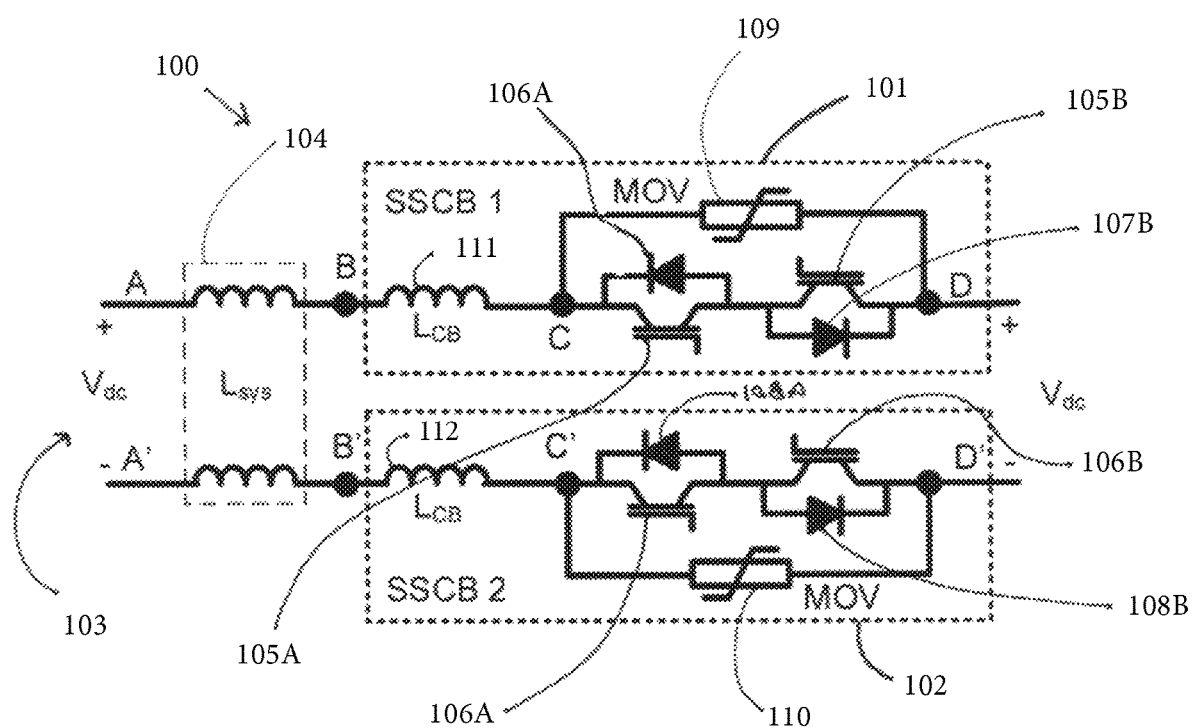
FIG. 1 shows a topology of a traditional SSCB.

To better illustrate the improvement of the disclosed SSCB, the operation principle of the traditional SSCB design is briefly reviewed first. As previously mentioned, the traditional SSCB design mainly consists of the semiconductor switches, voltage clamping circuit and fault current limiting device. One example SSCB 100 is depicted in FIG. 1. There are two identical SSCBs, 101 and 102, with one installed in each pole of the dc system 103. Each SSCB consists of two anti-series Si IGBTs (105A/B;106A/B) with anti-parallel diodes (107A/B;108A/B) to carry and break bi-directional currents. The metal-oxide varistor (MOV) (109;110) is connected in parallel with the semiconductor devices to clamp the peak voltage. $L_{sys}$ 104 represents the system inductance from the dc power system components, such as long cables, and $L_{CB}$ (111;112) represents the fault current limiting inductor inside the SSCB. Other types of semiconductor switches, voltage clamping circuits and/or fault current limiting device can be considered in the SSCB implementation. But the operation principle stays the same.

Figure 2:
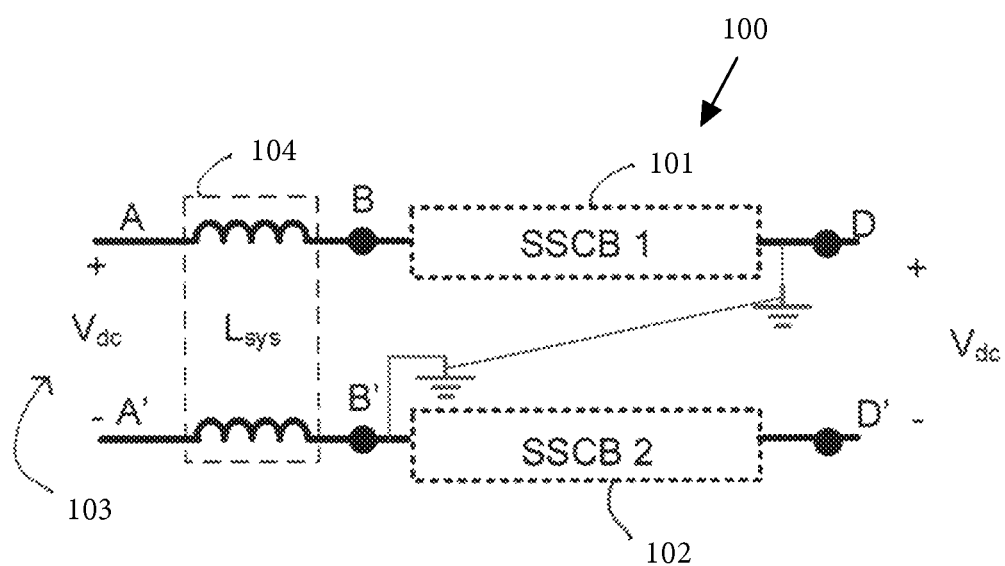
FIG. 2 shows the Impact of Double System Ground Faults.

The reason to install one SSCB in each pole is to enable the system to handle single point ground fault. As a flight critical component for the hybrid electric propulsion, the MVDC system needs to continue running at full power with single point ground fault. In other words, even if there is a ground fault in the system, the SSCB must have the capability to clear the fault current when a second ground fault occurs. As shown in FIG. 2, the SSCB on the negative dc pole can be bypassed by the second system ground fault at point D together with the first system ground fault at point B'. Thus, it is of critical necessity to involve one SSCB on each dc pole. But this also doubles the power loss and weight of SSCB in each bus location, which make it even more challenging to meet the efficiency and specific power targets.

Figure 3:
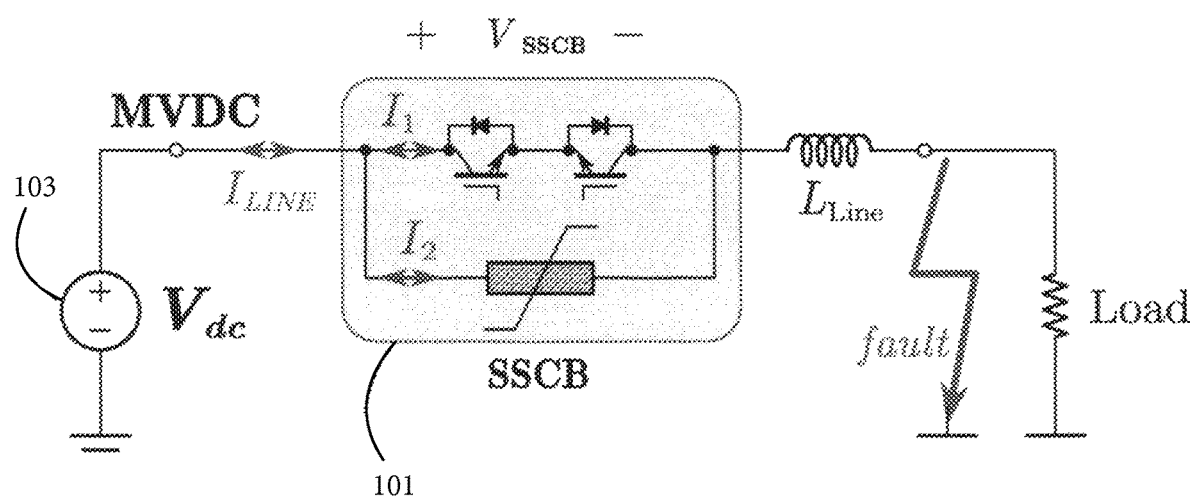
FIG. 3 shows a SSCB in a MVDC system.

When both SSCBs are functional, each one only needs to block half the dc link voltage. When only one SSCB is functional, such as the case in FIG. 2, the SSCB must be able to clear the fault by itself. This is the worst case when designing the SSCB. Described in this discloser, only the worst case is analyzed and the dc system can be simplified as shown in FIG. 3. Here, $L_{Lime}$ is the total inductance consisting of $L_{sys}$ and $L_{CB}$ as introduced in FIG. 1, which limits di/dt of the system fault current.

Figure 4:
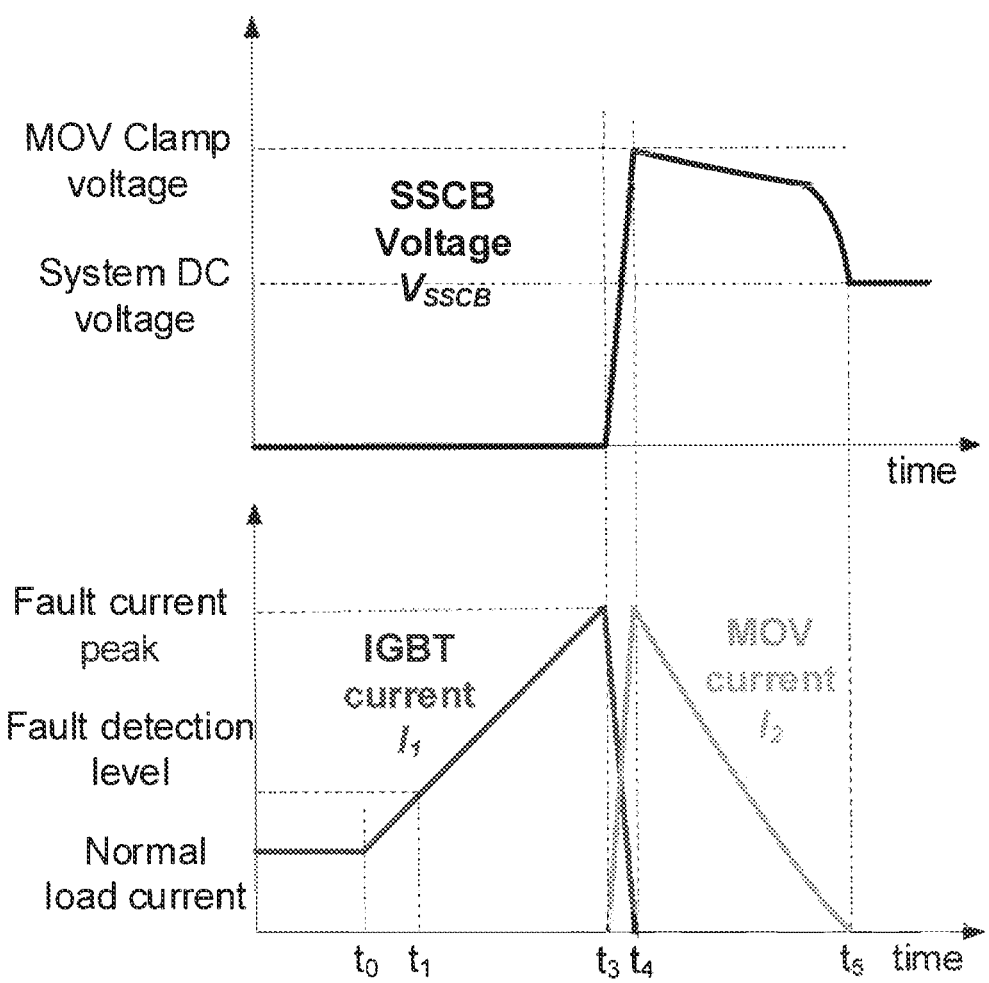
FIG. 4 shows a typical switching waveforms of the traditional SSCB.

The typical switching waveforms of the traditional SSCB are shown in FIG. 4. The top figure depicts the waveform of the voltage across SSCB ($V_{SSCB}$) and the bottom figure depicts the waveforms of the current flowing through IGBT ($I_1$) and MOV ($I_2$).

As shown in FIG. 4, before $t_0$, the system is under normal operation, $V_{SSCB}$ is close to zero and the system current only flows through the IGBT. At $t_0$, a short circuit fault occurs, and the IGBT current ($I_1$) will increase rapidly. The rising speed is determined by the dc bus voltage ($V_{dc}$) and the total value of system inductance ($L_{sys}$) and current limiting inductor ($L_{CB}$) as in (1).

$$\frac{di}{dt} = \frac{V_{dc}}{L_{sys} + L_{CB}} \quad (1)$$

Once the fault current exceeds the predefined protection threshold ($I_{th}$) at $t_1$, the fault protection scheme is activated. After that, the fault current will keep increasing until the IGBT is turned off at $t_3$ and the fault current is fully commutated from IGBT to MOV around $t_4$. The time difference between $t_1$ and $t_4$ is called the response time $t_d$, which includes the process time of the control circuit to generate the turn-off command and the time to fully turn off the IGBT.

The peak fault current can be estimated as $$I_{pk} = I_{th} + \frac{V_{dc}}{L_{sys} + L_{CB}} t_d \quad (2)$$

After the fault current is commutated to MOV, the MOV's clamping voltage is higher than the dc bus voltage. Thus, after $t_4$, the MOV's clamping voltage will drive the current down and eventually clear the fault at $t_5$.

Based on (2), if $L_{sys}$ is close to zero in the worst case, a current limiting inductor must be installed to limit di/dt, so that the peak current will not exceed the maximum value within $t_d$. Although a lower $I_{th}$ and $t_d$ can help to limit the fault current, which means the protection system can respond to a system fault earlier and faster, their impact is limited if the system current rising speed is very high. In addition, a lower $I_{th}$ or $t_d$ could make the SSCB sensitive to the system noise, especially in a harsh EMI (Electromagnetic Interference) environment, such as the converter based high power system.

B. Disclosed SSCB

Figure 5:
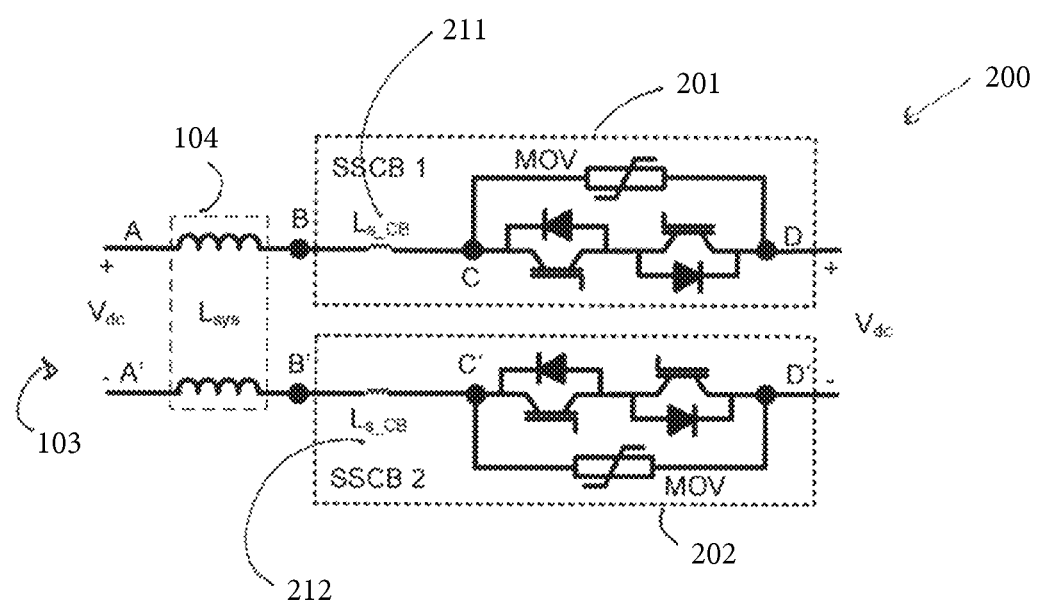
FIG. 5 shows a topology of a SSBC according to an exemplary embodiment of this disclosure.

The circuit diagram of the disclosed SSCB 202 is depicted in FIG. 5. Compared with the traditional design, the current limiting inductor (111;112) is eliminated, and $L_{s\_CB}$ (211; 212) only represents the stray inductance inside the SSCB (201;202) which is typically in the range of tens of nanohenries. The current limiting function is realized with reduced IGBT gate voltage.

As is well known, the IGBT normally operates in the saturation region when the load current is within its rated range, and the voltage drop across the device usually is only a few volts. However, once the current is sufficiently high, IGBT will exit the saturation region and enter the active region. Consequently, the IGBT terminal voltage will increase dramatically with the load current, until the load current reaches the IGBT saturation current level. In other words, the system current is only determined by the IGBT's saturation current level and the IGBT acts similar to an ideal current source. To maintain the saturation current level, IGBT can adapt its terminal voltage automatically until there is no net voltage to drive the system current up or down, like an active current limiter. The IGBT's saturation current level is mainly determined by the gate voltage and device temperature. By adjusting its gate voltage, the peak system fault current can be selected. The typical switching waveforms of the disclosed SSCB are shown in FIG. 6.

Figure 6:
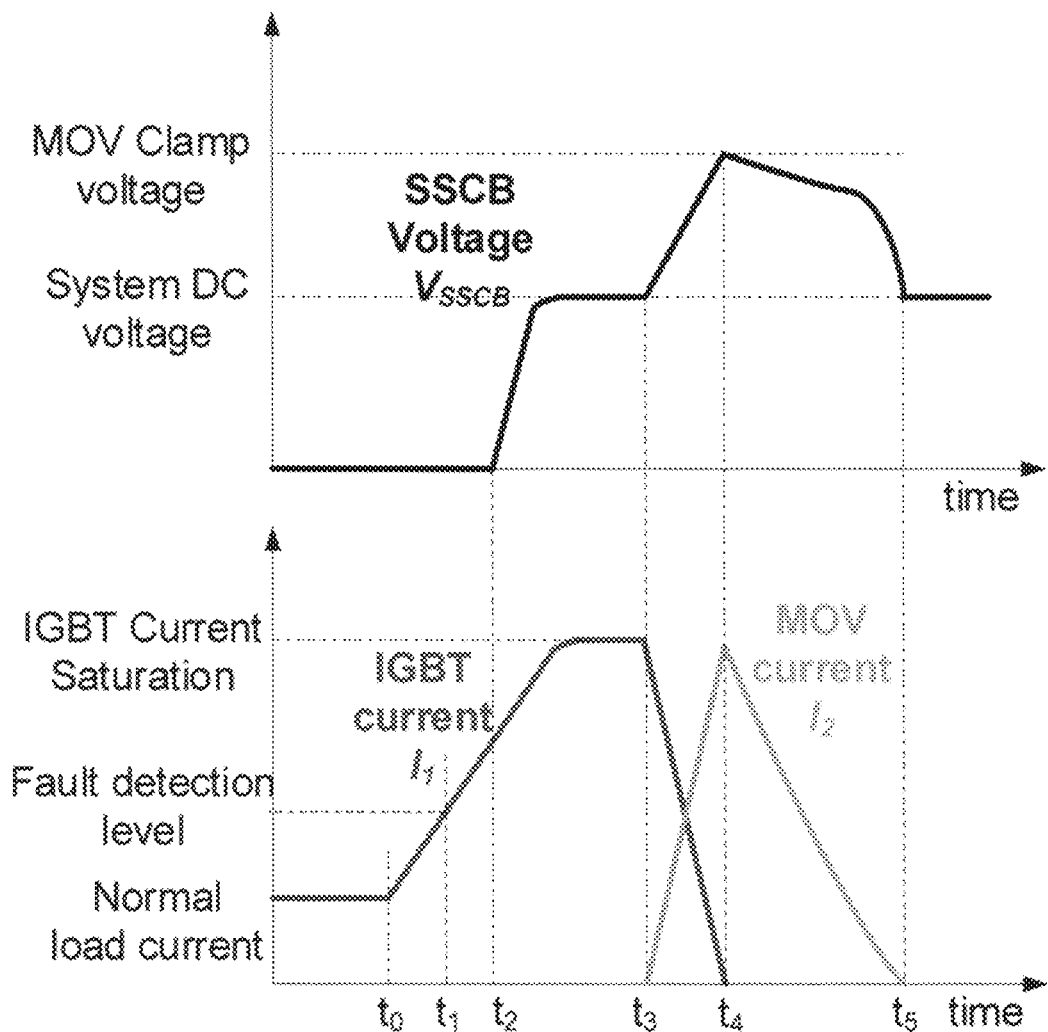
FIG. 6 shows typical switching waveforms of a SSCB according to an exemplary embodiment of this disclosure.

Just like in FIG. 4, the top figure in FIG. 6 shows the waveform of the voltage across the SSCB and the bottom figure shows the waveforms of the current flowing through the IGBT and MOV. Before $t_0$, the system is under normal operation, the voltage across the SSCB ($V_{SSCB}$) is close to zero and the system current only flows through the IGBT. At $t_0$, a short circuit fault occurs, and the IGBT current ($I_1$) starts to increase. Compared with the results in FIG. 4, without the current limiting inductor, the system fault current rising speed is much higher. Like the case with the traditional design, the fault current is detected at $t_1$ and after $t_d$, the IGBT is turned off at $t_4$. After that, the system fault current is cleared in the same way as in the traditional design.

Unlike in the traditional SSCB, in the disclosed SSCB, when the system fault current is high enough between $t_1$ and $t_3$, the IGBT exits the saturation region and enters the active region around $t_2$. Consequently, the voltage across the IGBT increases rapidly together with the system fault current until it reaches the system dc voltage level as shown in FIG. 6. At this moment, the voltage drop across the system inductance is zero, so the system fault current will stop increasing and be clamped at the IGBT saturation current level until the IGBT is turned off. In this process, the IGBT replicates the same current limiting function without a current limiting inductor.

II. IMPACTS OF THE DISCLOSED SSCB

To better explain the impacts of the disclosed SSCB, a solid state circuit breaker is detailed as the example in this section with key specification summarized in Table I.

TABLE I

| Key specifications of an example SSCB | |
|---|---|
| Rated dc bus voltage | 2 kV |
| Rated dc current | 1.2 kA |
| Protection Threshold Current | 3 kA |
| Peak fault current | 5 kA |
| Specific power | 100 kW/kg |
| Efficiency | 99.5% |
| Fault response time | >1.5 µs |

A. Power Density

One key benefit of the disclosed SSCB is its high specific power, which is undoubtedly critical for aviation applications, due to the elimination of current limiting inductors. To meet the 100 kW/kg specific power target, the total weight of two 2 kV 1.2 kA SSCBs on two dc poles is only 24 kg, or 12 kg each.

In this design, the response time (td) is selected to be 1.5 µs, the peak fault current is limited to 5000 A, and the fault detection level is set to be 2000 A. If no system inductance exists, to achieve this goal, the value of current limiting inductor can be calculated as $$L_{CB} = \frac{V_{dc}t_d}{\Delta i} = \frac{2000V \times 1.5\mu s}{(5000-2000)A} = 1\mu H \qquad (3)$$

Such a 1 µH inductor needs to carry 1200 A current continuously and to handle a transient current of 5 kA without significant core saturation. In addition, as mentioned in Section I, the current limiting inductor is inside the SSCB and can be bypassed upon double ground faults. Thus, one inductor is needed for each dc pole to allow continuous operation of the system with a single point ground fault.

Without a detailed inductor design, the weight of such a 1 µH inductor can be estimated based on the existing design with similar current ratings. As reported in [Ref. 2], a 1.5 µH 430 A inductor weighs 3.3 kg so the energy density is 42 kJ/kg. With a similar energy density, the weight of such 1 µH 1200 A inductor is about 17 kg, which has not even considered the requirement to handle the peak transient current that is 4 times the nominal value. With a much larger core size to handle the peak current, it would be no surprise if the actual weight of the inductor is higher than 20 kg.

With an optimized design, the inductor weight could be lighter than the estimated value. But it is obvious that with the traditional current limiting inductor, it is impractical for each SSCB to meet the 12 kg weight or 100 kW/kg specific power density target. Thus, the traditional design cannot meet the aviation application requirements.

B. Efficiency

Most IGBT device vendors recommend driving their IGBTs with a 15 V gate voltage. Although a higher gate voltage can further reduce the IGBT conduction loss, too high a gate voltage could damage the device gate. 15 V happens to strike a good balance between the device conduction loss and gate voltage safety margin.

With a reduced gate voltage, the IGBT conduction loss will increase. However, a detailed analysis can demonstrate that with a carefully chosen gate voltage, such additional power loss or efficiency penalty is negligible in the intended load range due to the nature of minority carrier devices.

In the example SSCB design described herein, to carry 1.2 kA continuously, block 2 kV dc and meet the efficiency target of 99.5%, a 3.3 kV 1500 A FZ1500R33HL3 IGBT module by INFINEON is selected. With a 15 V gate voltage, the IGBT saturation current level is 6.4 kA at 150° C. junction temperature. [Ref. 4] At lower junction temperature, the saturation current level is even higher, which cannot meet the 5000 A peak current requirement.

The gate voltage selection is a trade-off between the IGBT current saturation value and conduction voltage drop. Lower gate voltage results in lower IGBT saturation current during faults but higher dissipation during normal conduction. The final selection of $V_{GS}$ aims to achieve a good compromise to meet the SSCB design requirements. 12 V was picked based on a series of testing. With a 12 V gate voltage and 25° C. die temperature, the IGBT starts to enter the active region when carrying 3 kA and the IGBT terminal voltage ($V_{ce}$) increases to 20 V correspondingly. This is shown as the moment $t_2$ in FIG. 6. The IGBT can enter the active region when carrying only 2.5 kA if the die temperature is increased to 125° C. [Ref. 4]. The datasheet doesn't provide the saturation currents with different gate voltages. Thus, tests are conducted to measure the saturation currents at different gate voltages at room temperature.

Figure 7:
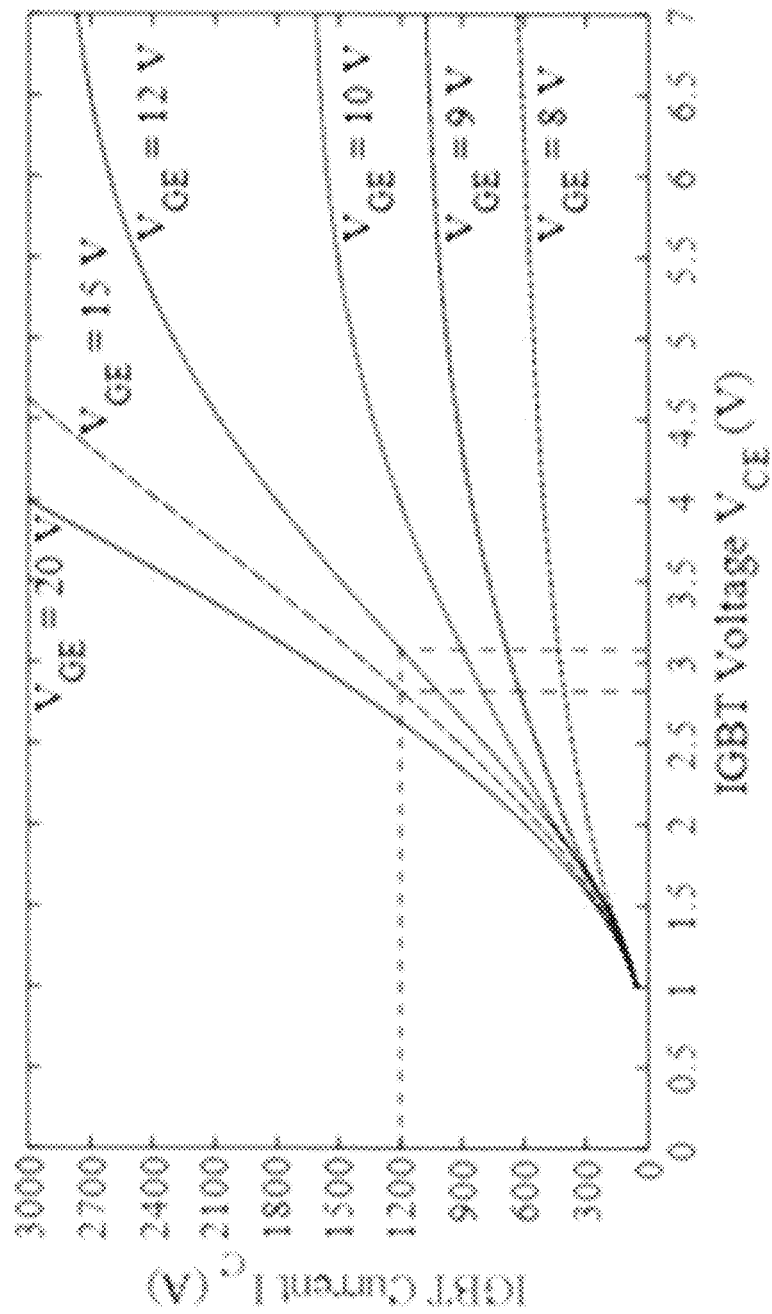
FIG. 7 is a V-I curve of INFINEON FZ1500R33HL3 dependence on gate voltages at 150° C. junction temperature.

The V-I curve of the IGBT module with different gate voltages are shown in FIG. 7. As shown in FIG. 7, when carrying 1200 A the typical voltage drop is 2.8 V with 15 V gate voltage and 3.1 V with 12 V gate voltage, resulting in a voltage difference of 0.3 V. In other words, the reduction of gate voltage from 15 V to 12 V introduces an additional power loss of 360 W per IGBT. The impact on the overall SSCB efficiency is only 0.03% in the 2.4 MW system.

A 0.03% efficiency loss in the semiconductor devices is negligible especially considering that the power loss in the current limiting inductor is eliminated in the disclosed solution. In addition, the data in FIG. 7 is for 150° C. junction temperature. Since the device junction temperature is lower under normal operation, the additional loss could be even lower.

C. MOV Energy

Energy absorbed by the MOV is another design constraint. Repetitive absorption of excessive energy is a "lifetime-threatening" process that may cause overheating, non-linear degradation, and mechanical failure in a MOV structure, which may determine the reliability of the SSCB.

As shown in FIG. 6, if the MOV clamp voltage is approximated to be constant at $V_{clamp}$, the system current or MOV current will decrease with a constant speed, and it can be modeled as a function of time, $$i_{MOV} = I_{peak} - \frac{V_{clamp} - V_{dc}}{L_{sys} + L_{CB}} t_{clear} \quad (4)$$

where $I_{peak}$ is the peak value of fault current, $L_{sys}$ is the system inductance, $L_{CB}$ is internal inductance of SSCB and $t_{clear}$ is elapsed time after the current is fully commutated from the IGBT to the MOV (i.e., from $t_4$ to $t_5$ in FIG. 6).

Since the energy absorbed by the MOV is the integration of the product of the instantaneous voltage across the MOV and the instantaneous current through the MOV, the total energy absorbed by the MOV can be calculated as $$E_{MOV} = \frac{1}{2}(L_{sys} + L_{CB})I_{peak}^2 \frac{V_{clamp}}{V_{clamp} - V_{dc}}$$

From (5), when the MOV clamping voltage and system voltage are fixed, the MOV energy is proportional to the sum of system inductance and (5) SSCB internal inductance and the square of the peak current.

As can be observed, although the peak current is higher with the disclosed SSCB solution, the MOV in the disclosed SSCB design absorbs similar or lower energy compared to that in the traditional SSCB. This is mainly because the energy stored in the current limiting inductor is eliminated.

D. Mechanical Design Freedom

Figure 10:
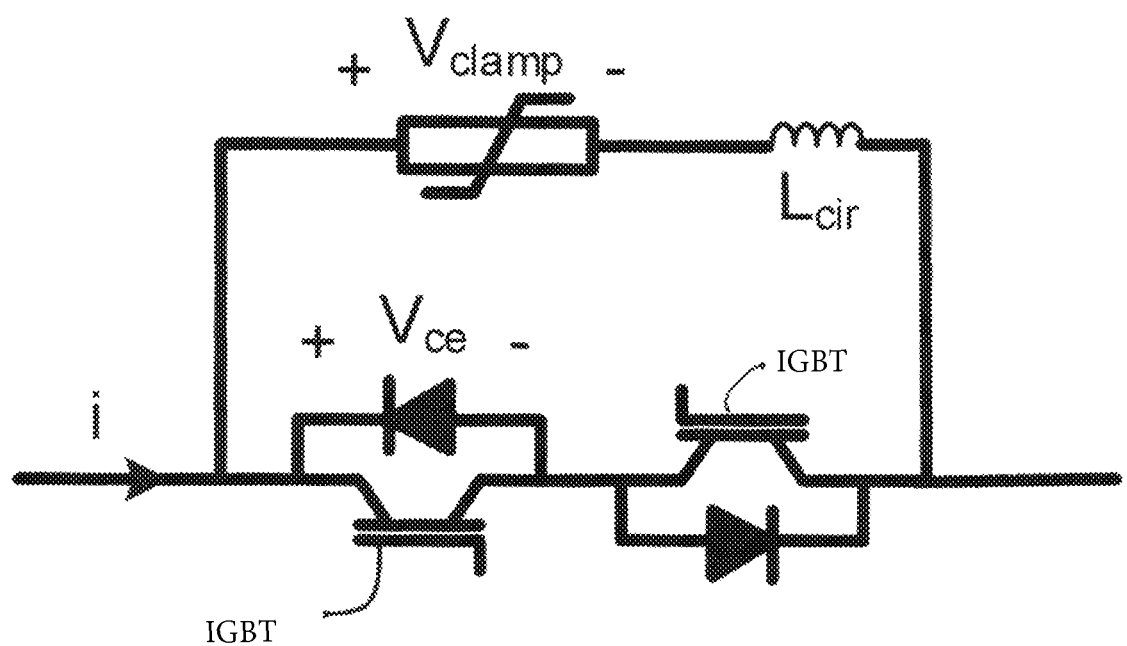
FIG. 10 shows a Commutation loop between IGBT and MOV.

As demonstrated in FIG. 4 and FIG. 6, after the IGBT is turned off, the system current is commutated from the IGBT to the MOV between $t_3$ and $t_4$. As in any converter power stage, there is parasitic inductance in the commutation loop between the IGBT and the MOV as shown in FIG. 10. FIG. 10 shows the current flows from left to right and the left IGBT needs to be turned off. The commutation loop parasitic inductance is represented as $L_{cir}$. Such parasitic inductance cannot be eliminated, and its value is mainly determined by the mechanical layout. When the system fault current is commutated from the IGBT to the MOV, a transient voltage is generated due to high di/dt. Such a transient voltage together with the clamping voltage across MOV determines the maximum voltage across the IGBT.

Figure 9:
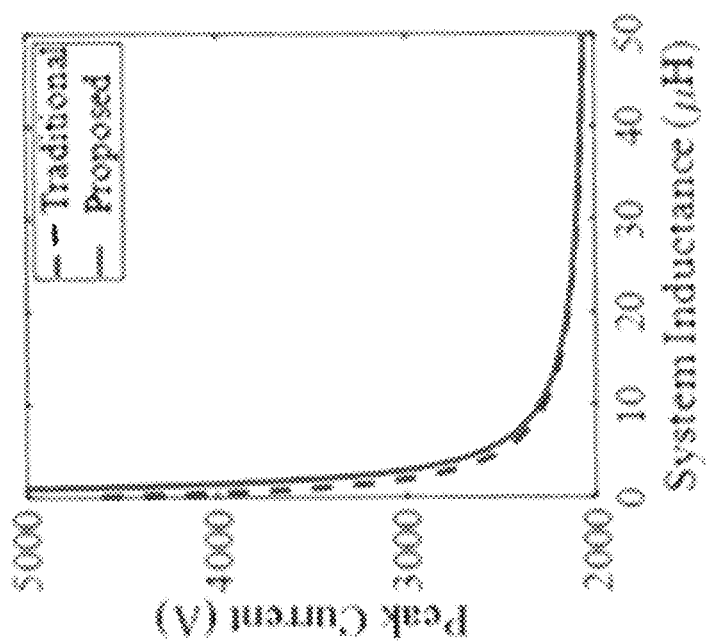
FIG. 9 shows a Peak current comparison.
Figure 8:
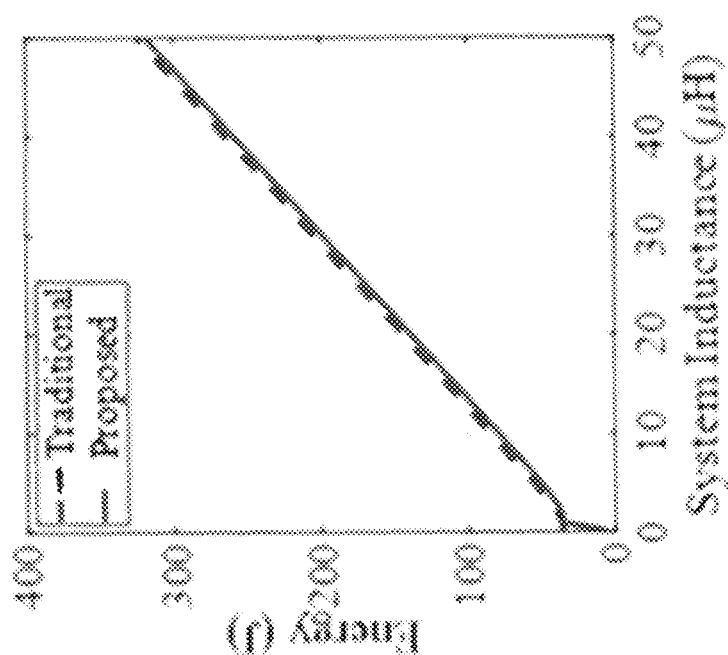
FIG. 8 shows an MOV energy comparison.

Based on (2) and (5), the peak current and energy absorbed by the MOV as a function of system inductance for the traditional design and disclosed design are summarized in FIG. 8 and FIG. 9. In both cases, the MOV's clamp voltage is set to be 3 kV, the system dc voltage is set to be 2 kV, fault response time is 1.5 µs and the system inductance varies in the range of 200 nH and 50 µH. In the traditional design, the current limiting inductor is assumed to be 1 µH; 50 nH is assumed to be the SSCB's internal parasitic inductance in the disclosed design.

Thus, the peak voltage across the IGBT can be estimated as $$V_{peak} = V_{clamp} + L_{cir}\frac{di}{dt}$$

where $L_{cir}$ is the commutation loop inductance and $V_{clamp}$ is the (6) MOV's clamping voltage when carrying the fault current.

It is critical to limit such voltage below IGBT's maximum voltage rating to avoid IGBT damage. From (6), to reduce the transient voltage, either the current is commuted with a lower speed, or the mechanical structure needs to be optimized to reduce the parasitic inductance.

As mentioned above, to limit the peak fault current below 5 kA with 1 µH inductance, the response time needs to be 1.5 µs or lower, which includes the fault detection time and IGBT turn-off time. Thus, the IGBT needs to be turned off in less than 1 µs. In other words, the di/dt is higher than 5 kA/µs. To limit the transient over voltage across the parasitic inductance below 500 V, the parasitic inductance needs to be below 100 nH.

Such low parasitic inductance can be realized with a compact mechanical layout and/or laminated busbars, which works for most applications. However, these methods can introduce big challenges for aviation applications. First of all, a compact mechanical layout and laminated busbar will introduce insulation challenges, such as partial discharge (PD), and require special design for high altitude operation. If additional encapsulation material is used to enhance the insulation performance, the weight of SSCB will increase, leading to a lower power density. In addition, the laminated busbar can be much heavier than regular busbar, because the current path cannot be fully controlled and not all the conductor material can be fully leveraged to carry current evenly.

With the disclosed SSCB solution, the peak current is limited to IGBT's saturation current level independent of the fault response time. Thus, it is safe to apply a fault response time much longer than 1.5 µs, so the IGBT can be turned off in a much slower manner. For example, if the turn-off time is increased to 4 µs, the parasitic inductance can be increased to 400 nH while still limiting the transient voltage below 500 V. Please note that such slow turn-off will introduce additional switching loss but have negligible impacts on the SSCB's performance or reliability. However, this can provide tremendous design freedom for mechanical layout. The component layout can be optimized for easy assembly and higher clearance to handle insulation challenges at high altitude instead of low parasitic inductance. In addition, non-laminated busbar with special shapes can be used to accommodate the mechanical layout for volume and weight reduction.

E. Reliability

With the rated gate voltage, e.g., 15 V, the typical IGBT saturation current level is around 5 times of its rated current and the IGBT can only carry such current for a very short time, e.g., 10 μs. During this short period of time, the IGBT blocks full dc voltage and carries high current simultaneously. In the example design, each IGBT can carry 5 kA and block 2 kV at the same time, leading to a 10 MW power loss. Such a high-power loss can transiently increase the IGBT's die temperature. Although the IGBT module's reliability is typically related to thermal stress quantified as temperature swings occurring in the semiconductor dies and the power module structure, the temperature surge caused by the disclosed solution can also potentially impact the device lifetime and reliability.

In the disclosed SSCB, this issue is mitigated with lower gate voltage and shorter duration time. With 12 V gate voltage, the short circuit current is reduced by roughly 30% compared with the typical case with 15 V gate voltage, and the duration is limited to be less than 10 μs, e.g., around 5 μs. In addition, the IGBT only blocks up to 2 kV instead of 2.5 kV and the junction temperature is much lower than 150° C. as specified in the short-circuit test condition in [Ref. 4]. Therefore, the total accumulated loss is reduced to be less than 50% of the worst case listed on the datasheet with additional junction temperature margin. If both SSCBs operate identically, each SSCB only needs to block half of the dc link voltage so the power loss can be further reduced by half.

There is no systematic study on the negative impact of simultaneous high voltage and high current, or high power dissipation, on device reliability. According to [Ref. 5], the IGBT can tolerate thousands of short circuit pulses if ESC, the energy incurred during the short circuit, is below the critical energy EC. But this is only for one specific device. More analysis and experimental evaluation are needed to quantify the impact.

For the disclosed SSCB, the worst case is when one SSCB pole is bypassed and the remaining pole has to clear the fault. This is a very rare case in the operation lifetime of SSCB, since two ground faults need to occur at specific locations to bypass one SSCB pole. Usually, a single ground fault can be detected by voltage monitoring, followed by proper procedure to eliminate the fault condition prior to a second fault. The SSCB is intended to be used as a current interruption component in all the conceivable application scenarios, including but not limited to the short circuit faults. In most cases, the SSCB only needs to cut normal current with the IGBT not in active mode. For example, a scheduled load shedding or an overload could necessitate current interruption, which is less stressful compared with short circuit fault clearing.

Due to the low probability of worst case scenario, its negative impact on the overall reliability of SSCB is very limited. No failure or performance degradation has been observed, which can partially support the conclusion. Even though the operation of IGBT in this mode reduces the lifetime of the SSCB, as long as such negative impact can be quantified, the SSCB can always be replaced after a certain number of operations. Considering its benefits, the disclosed method still is a practical and advantageous solution.

Iii. Design Challenges with High System Current Rising Speed

The disclosed SSCB can limit the peak fault current. However, due to the lack of current limiting impedance, the system fault current can rise with a high speed. Such high di/dt can introduce new challenges which do not exist in the traditional design. Most of them are related to the control of IGBT gate voltage. For MW MV applications, multiple IGBT chips are packaged inside one module and controlled as one device. The gate drive can only access the gate terminal of the module, not the gates of individual IGBT chips due to their distributed nature. This can result in nonuniform current distribution and potential oscillation during the high di/dt transient. In addition, magnetic coupling between the gate loop and the power circuit becomes significant at high di/dt and varies with the detailed current flow pattern.

Figure 11:
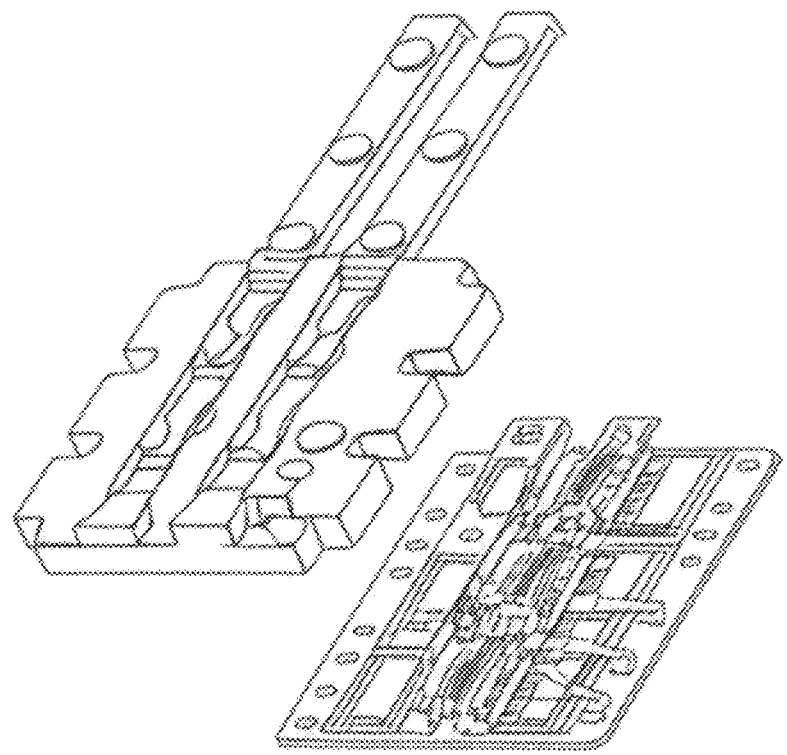
FIG. 11 shows an INFINEON IHM/IHV B module package and internal layout.

Although Kelvin terminals are provided at the IGBT module for the gate drive connection and the common source inductance is eliminated, the coupling between the gate loop and power circuit is apparent from the INFINEON IGBT module layout as shown in FIG. 11. The fault current flowing through busbars inside and outside the IGBT module generates a magnetic field which could be coupled to the gate loop. Due to the extremely high ramp rate of the fault current, such magnetic field can induce a voltage between the module gate terminal and the actual gate terminal of the IGBT chips. The current flow pattern in the power circuit depends on the busbar design and power cabling external to the IGBT module and affects the magnitude and polarity of such magnetic coupling.

Although $V_{ge}$ cannot be measured directly, its impact on the IGBT saturation current level can be observed. If $V_{ge}$ is increased because of the magnetic field, the peak fault current becomes higher than the expected value with $V_{ge\_ext}$. Reversely, the peak fault current becomes lower if $V_{ge}$ is decreased due to magnetic coupling. As presented in the next section, the system fault current peak value can vary by a factor of two with different busbar configurations.

The mutual coupling between the gate loop and power circuit is dependent on the module internal structure as well as external busbar design. Although such coupling theoretically can be leveraged to reduce the gate voltage at the fault moment to further limit the peak fault current, in this SSCB design, the busbar is optimized to mitigate the coupling between the fault current and the gate loop, so that the peak fault current is only dependent on the external gate drive voltage.

Because there is no detailed information of module internal layout, the busbar is designed and optimized based on a trial-and-error method. The experimental results presented in the next section verify the design.

The high di/dt of system fault current may also cause oscillation in the gate loop. The issues, analysis and solutions have been reported in [Ref. 6]. According to the exemplary embodiment described herein, the gate driver has been properly designed and optimized. Thus, no oscillation issues are observed in the test results.

IV. PROTOTYPING AND EXPERIMENTATION

A. Power Stage Description

Figure 12:
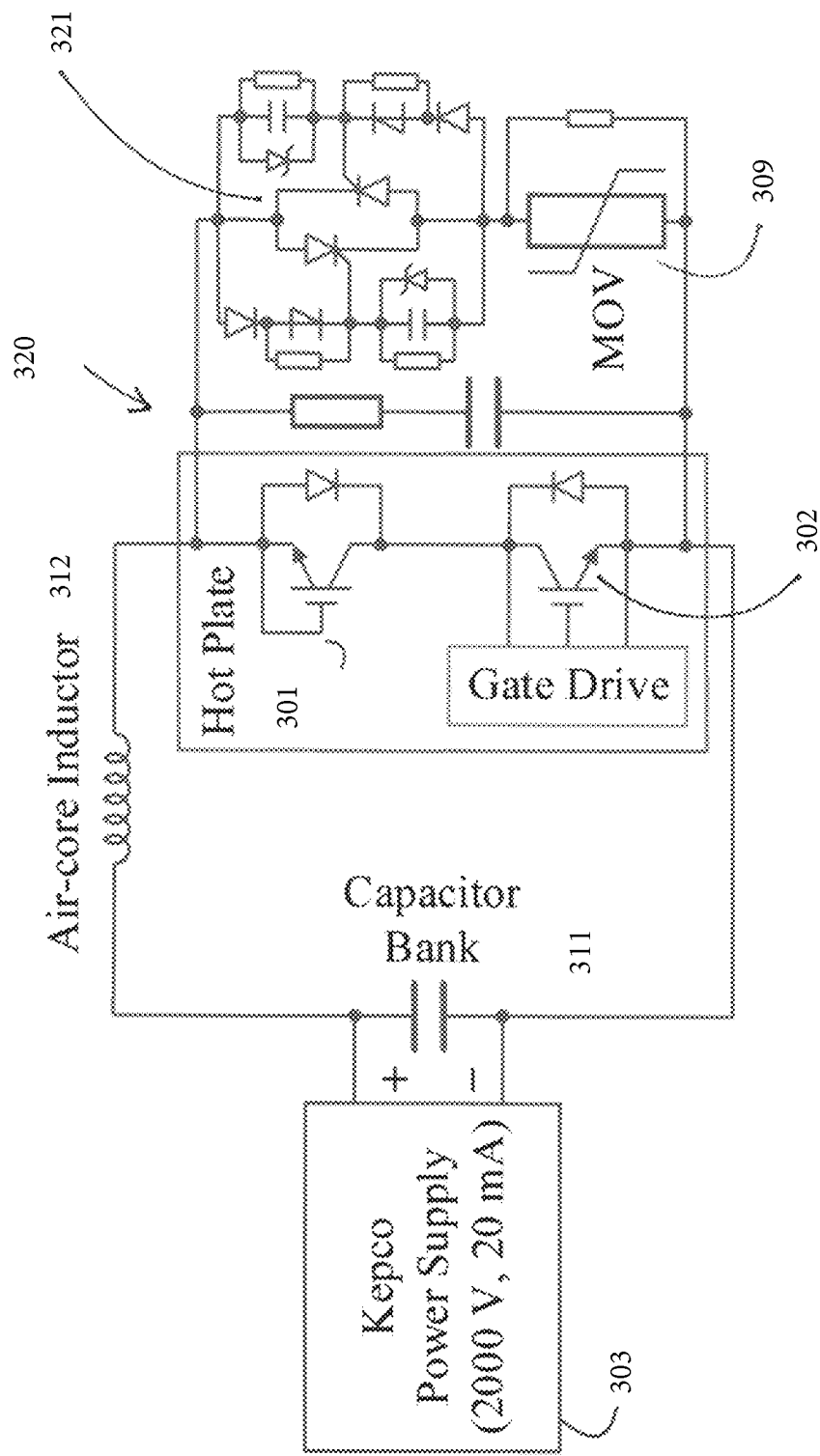
FIG. 12 is a Circuit diagram of a switching test bed.

An 2 kV/1 kA SSCB prototype is built and tested for performance evaluation. FIG. 12 presents the SSCB test circuit diagram.

The SSCB consists of two IGBT modules 301;302 (INFINEON P/N FZ3300R33HL3) connected back-to-back, an RC snubber 320, and an electronically triggered MOV (eMOV) 309 [Ref. 7]. The eMOV can reduce the peak clamping voltage inside the SSCB during fault clearing, enabling the use of 3.3 kV IGBT for the 2 kV system. This is the key technology to improve the SSCB's efficiency. The RC snubber (R=0.47Ω and C=1.5 μF) limits the transient voltage rise during IGBT turn-off and helps to mitigate the stress on the IGBT. The eMOV 309 consists of a thyristor module 321 as well as a MOV. The gates of the thyristor module are controlled by a passive circuit consisting of breakover diodes (BOD). Compared with the conventional MOV, the eMOV 309 allows the use of a MOV of lower clamping voltage without incurring excessive static dissipation during the SSCB off-state, thus optimizing the overall SSCB performance. A capacitor bank 311 and power supply 303 is utilized to emulate the DC source and an air-core inductor 312 represents the system inductance, which is adjustable between 0-50 μH. Switching test results are detailed in subsection D below.

B. Thermal Evaluation

Figure 13:
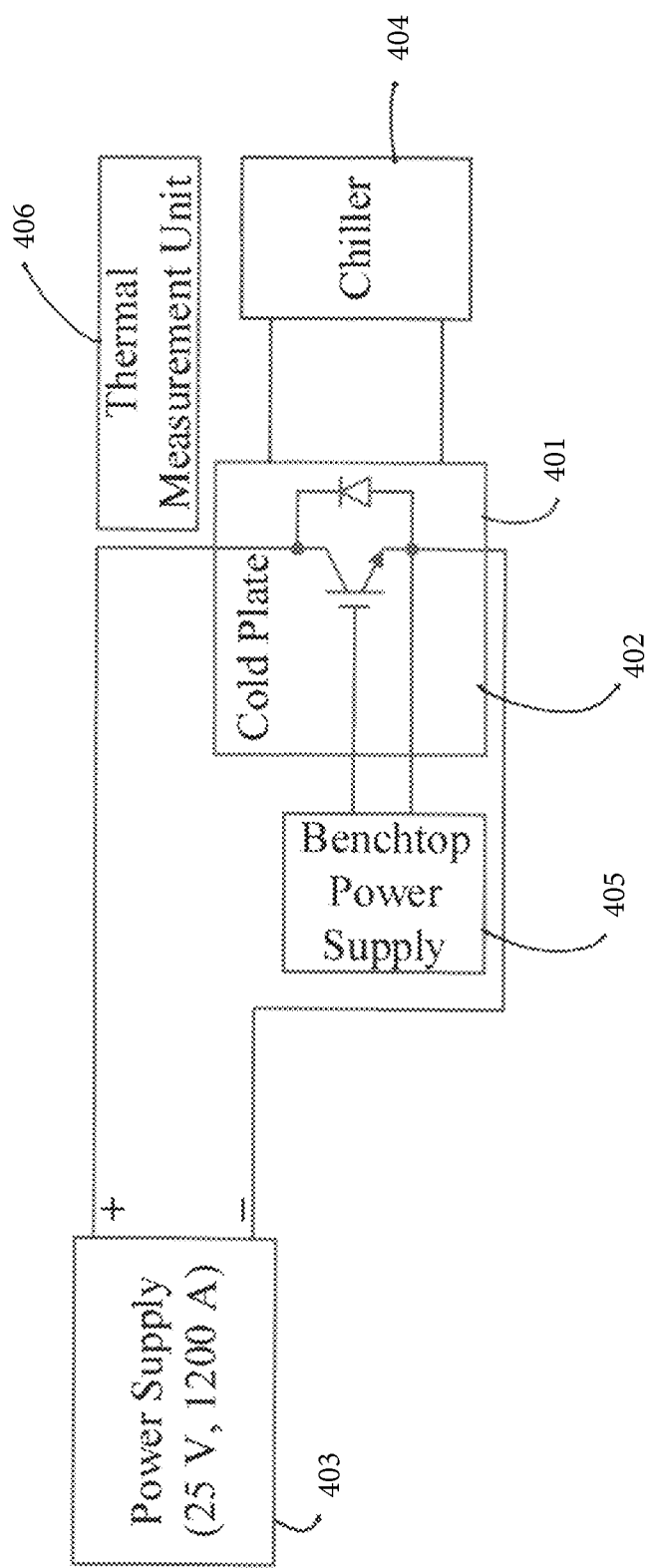
FIG. 13 is a Circuit diagram of a thermal test bed.

In addition to switching test, the SSCB conduction loss and thermal behavior are also evaluated. FIG. 13 presents the circuit diagram of the thermal test setup.

Figure 14:
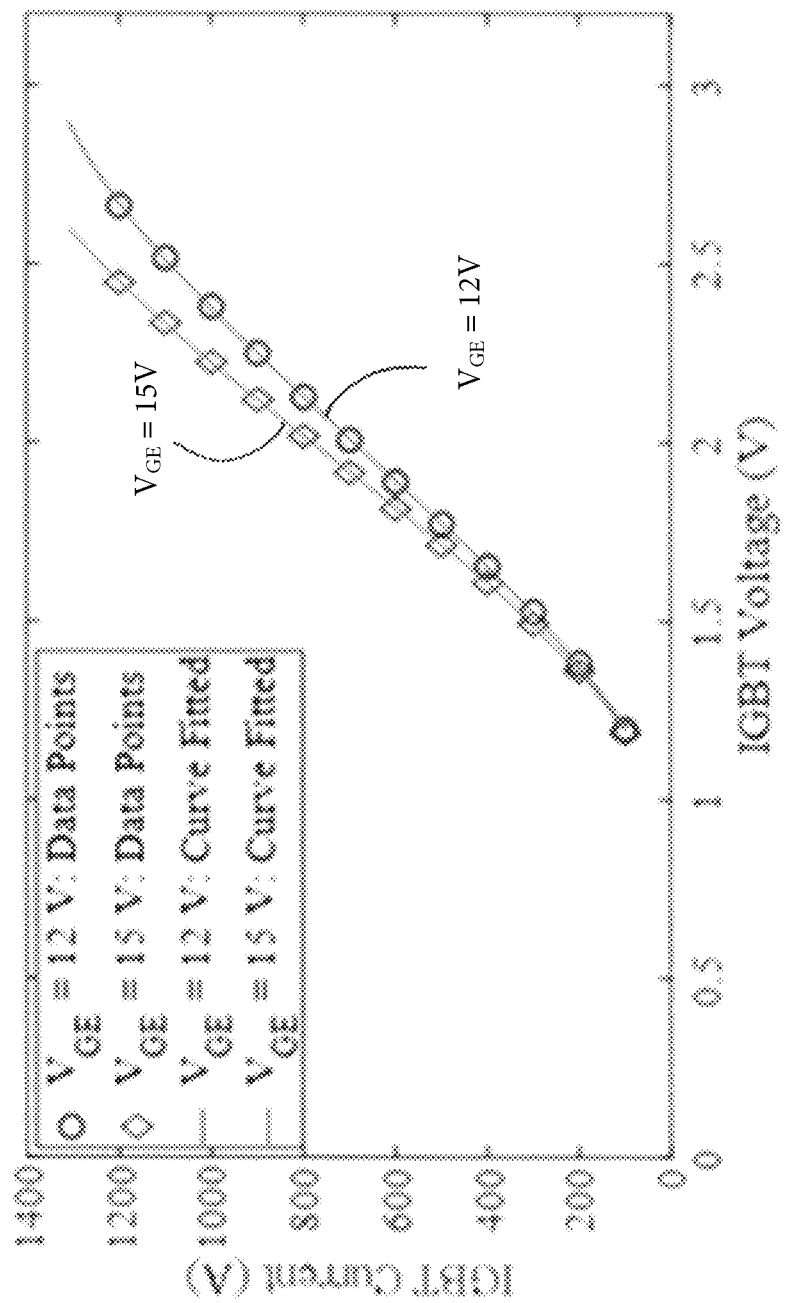
FIG. 14 shows Measured IGBT saturation voltage vs current.
Figure 15:
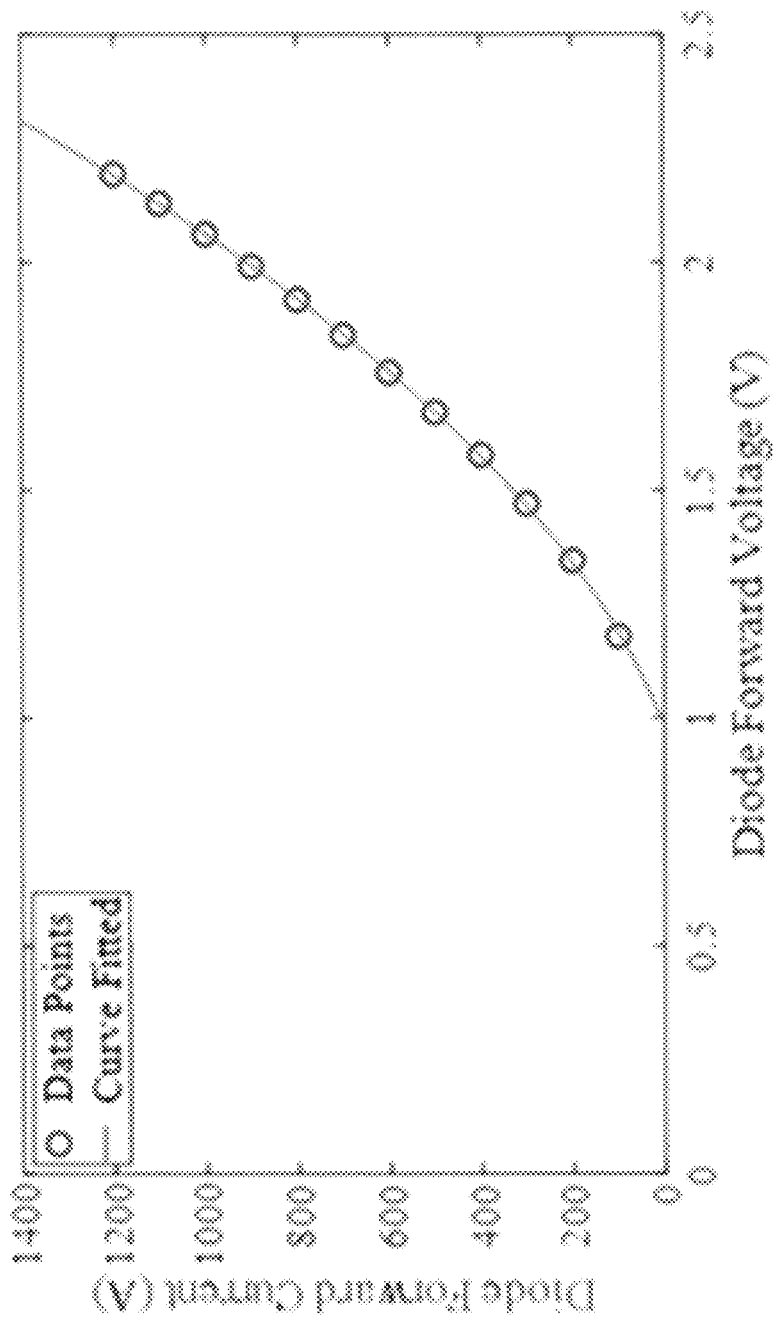
FIG. 15 shows Measured Diode forward voltage vs current.

A single IGBT module 401 suffices. It is mounted on a cold plate 402 cooled by a chiller 404. Temperatures are measured with a Thermal Measurement Unit 406. The IGBT saturation voltage and conduction loss are recorded over the load current range up to 1200 A with different gate voltages. The freewheeling diode forward voltage drop and power dissipation are evaluated with the high-current power supply cabling reversed and the IGBT gate negatively biased 405. FIG. 14 and FIG. 15 plot the measured voltage drop across the IGBT and diode respectively as a function of load current. As shown in FIG. 14, the increase in IGBT saturation voltage is insignificant when the gate voltage is decreased from 15 V to 12 V. At the full load current of 1200 A and nominal DC system voltage of 2 kV, the efficiency of the complete SSCB as shown in is ~99.5%, considering the conduction losses incurred in two IGBTs and two freewheeling diodes, with the coolant temperature at the cold plate inlet set at 15° C.

C. Busbar Shape

The busbar shape has a significant impact on the profile of the short-circuit current and its distribution among the IGBT chips. Upon a short-circuit fault, especially when the short-circuit impedance is low, high di/dt would result in strong magnetic coupling between the gate loop and power loop inside the multi-chip IGBT module. This can affect not only the internal current distribution among the IGBT chips, but also the total fault current in the external circuit. For the IHM-B IGBT module selected for the SSCB prototype, both the collector and emitter terminals have three termination points, including an IGBT emitter busbar as a narrow copper strip and a wide copper plane properly shaped for power cable termination.

Figure 16:
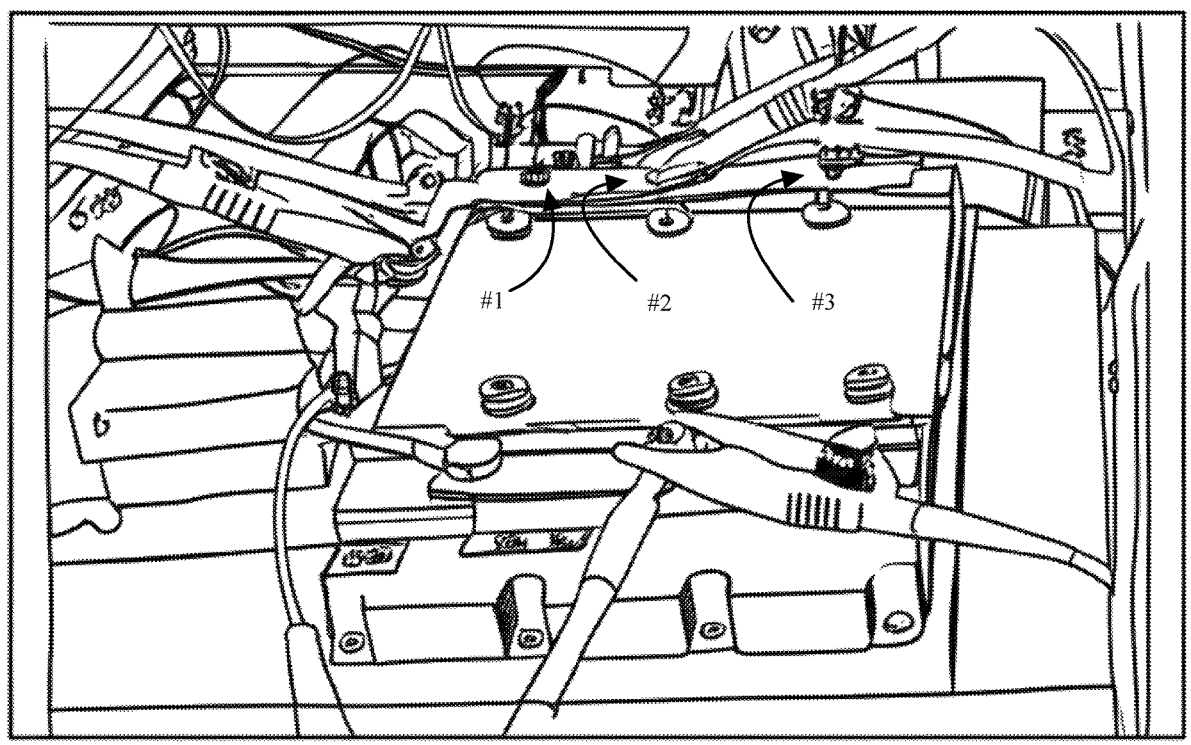
FIG. 16 shows a relatively Narrow emitter busbar.
Figure 17:
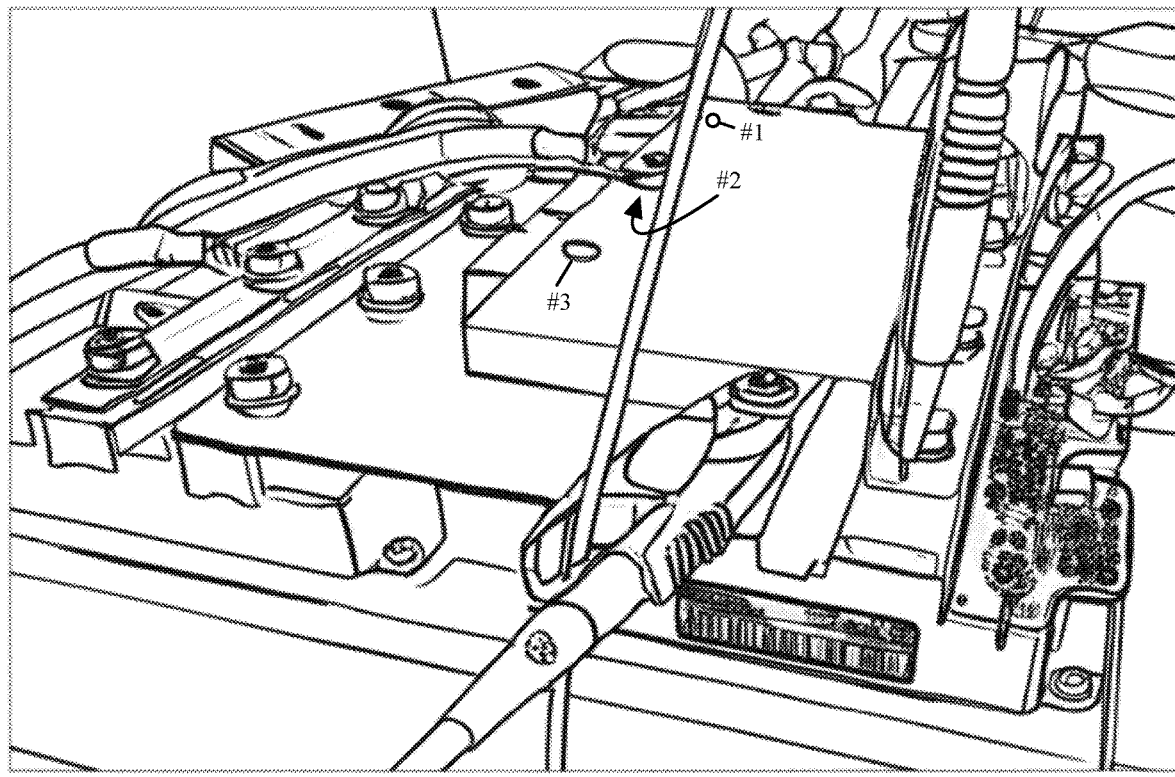
FIG. 17 shows a relatively Wide emitter busbar.

The difference in the short-circuit current profile is summarized in Table 2, where the termination points 1, 2 and 3 refer to the IGBT emitter power terminal farthest from, in the middle, and closest to the IGBT module gate terminal, shown in FIG. 16 and FIG. 17, respectively. Detailed switching waveforms with minimum short circuit impedance are presented in the next subsection.

TABLE II

IGBT Peak short circuit current vs emitter busbar shape, with $V_{GE\_ON}$ = 12 V

| | Emitter Busbar Shape | | | | | |
|---|---|---|---|---|---|---|
| | Narrow bus bar as in FIG. 16 | | | Wide bus bar as in FIG. 17 | | |
| | Termination Point | | | | | |
| | #1 | #2 | #3 | #1 | #2 | #3 |
| Peak IGBT Current (A) with $V_{dc}$ = 1400 V | 3922 | 6169 | >7613* | 4930 | 5232 | 4723 |
| Peak IGBT Current (A) with $V_{dc}$ = 1600 V | 3980 | 6365 | N/A** | 4663 | 5152 | 4389 |
| Peak IGBT Current (A) with $V_{dc}$ = 2000 V | 4204 | 6148 | N/A** | 4962 | 5213 | 4744 |

*current exceeds current sensor measurement range
**Data point not available due to safety concern.

It is apparent that if a single power cable is used together with the narrow copper strip as shown in FIG. 16 and FIG. 17 for external circuit connection, significantly different current profiles would result depending on which of the three terminals is used for cable termination. With the power cable terminated at position 3, the peak current value almost doubles compared with the case when the power cable is terminated at position 1. A wide copper plane as shown in FIG. 17 eliminates such ambiguity. The peak saturation current is very close to 5 kA.

D. Switching Test Results

Figure 18:
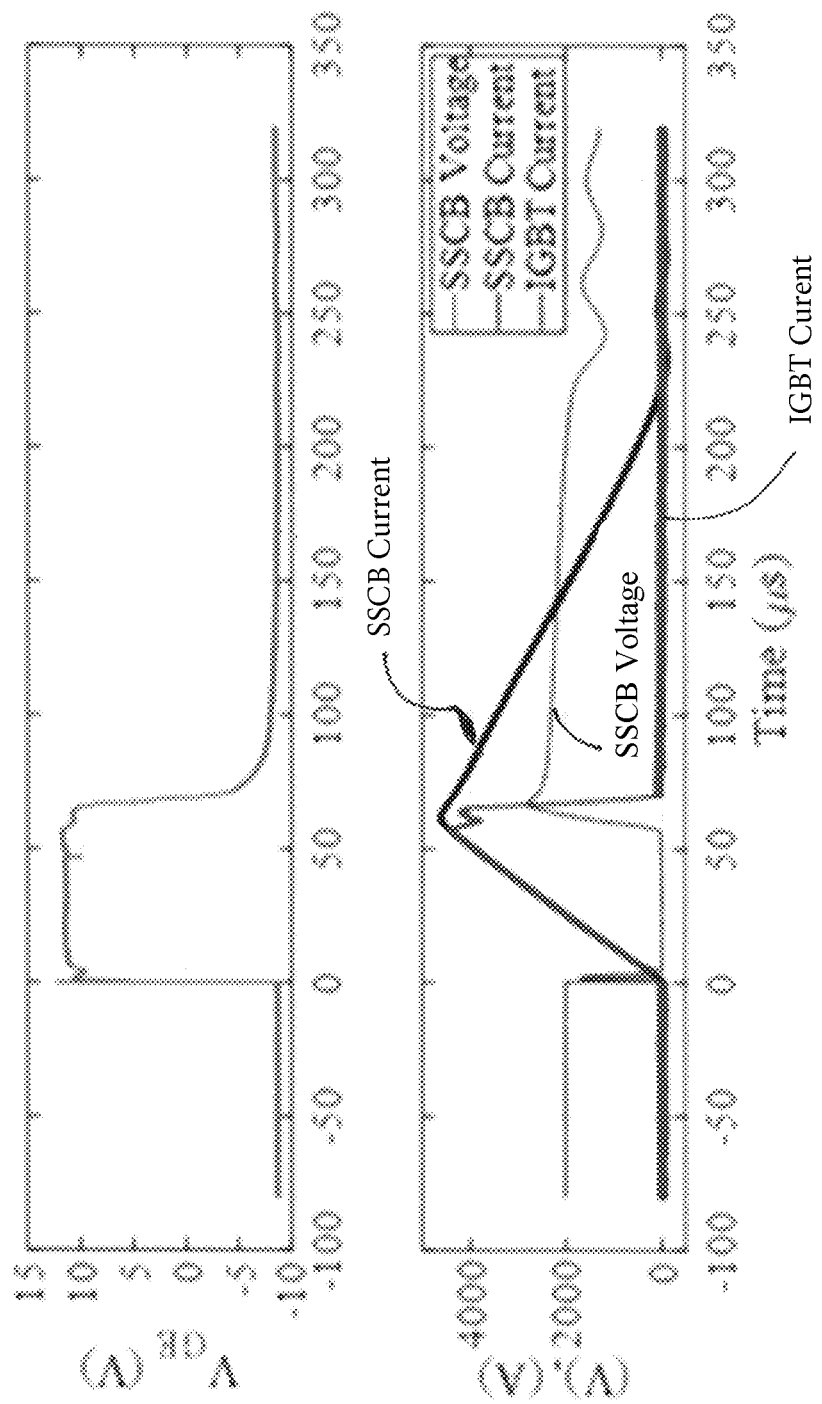
FIG. 18 shows Switching waveforms, where $L_{System}=25$ PH, $V_{DC}=2000$ V, $T_{Junction}$ is room temperature.
Figure 19:
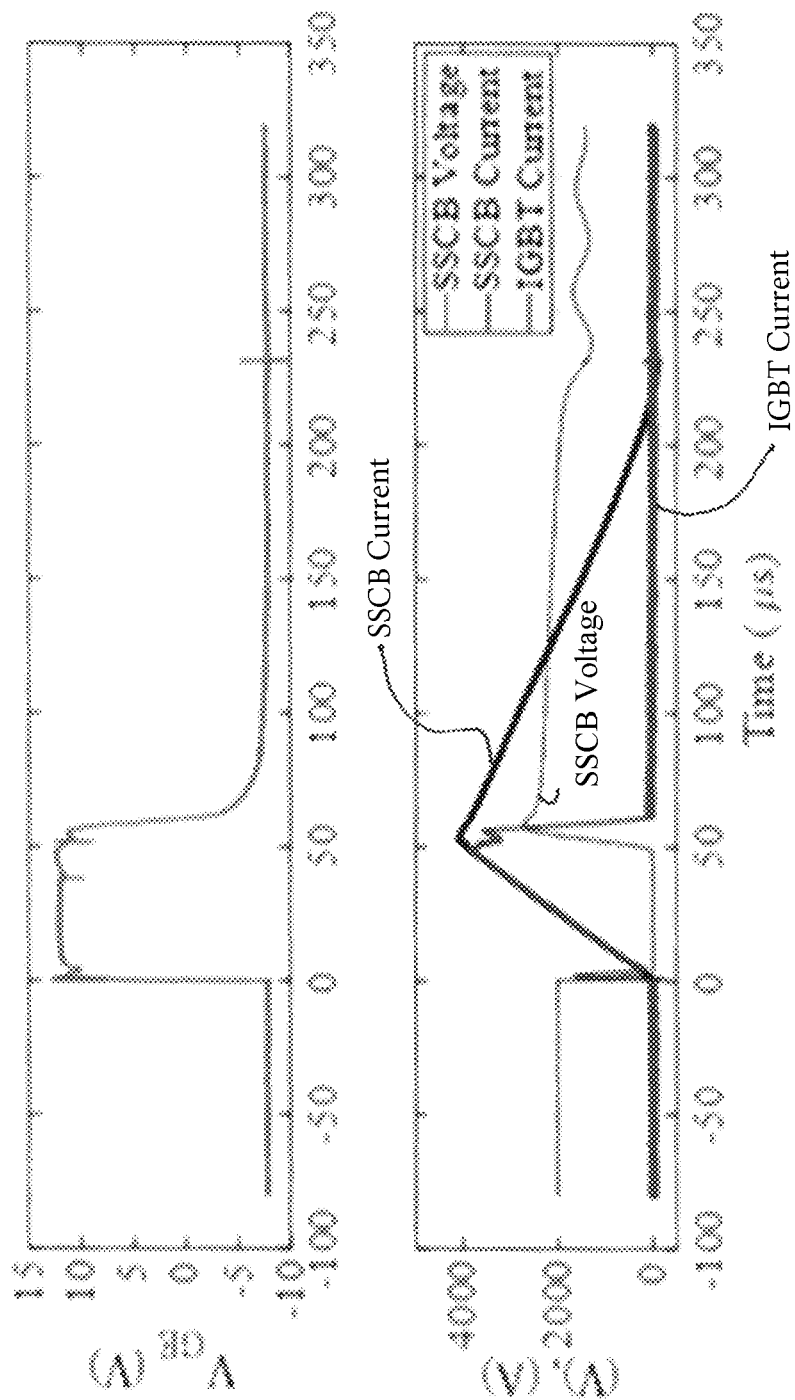
FIG. 19 shows Switching waveforms, where $L_{System}=25$ PH, $V_{DC}=2000$ V, $T_{Junction}=100°$ C.

The switching performance of the SSCB prototype has been evaluated with the wide emitter busbar under various operating conditions, including different short circuit impedances, different junction temperatures, and different gate drive parameters. As detailed in Section II, reduced gate voltage provides significant advantages in SSCB applications without incurring too high a penalty. For this reason, an on-state gate voltage of 12 V is selected. The test results are presented in this subsection. FIG. 18 and FIG. 19 show the SSCB voltage and current waveforms during the interruption of a short circuit developed with a system inductance of 25 μH and DC source voltage of 2000 V when the IGBT junction temperature is at room temperature and 100° C., respectively. The short circuit is detected and then acted upon by the gate drive's desaturation protection circuit. The system inductance is sufficiently high, so the fault current is interrupted before the IGBT enters the active region. The IGBT voltage and current trajectories during the short circuit current interruption stay well within its reverse bias safe operating area, thanks to the eMOV as well as properly sized RC snubber. At a higher junction temperature, the short circuit condition is detected sooner, and the fault current peak value is lower.

Figure 20:
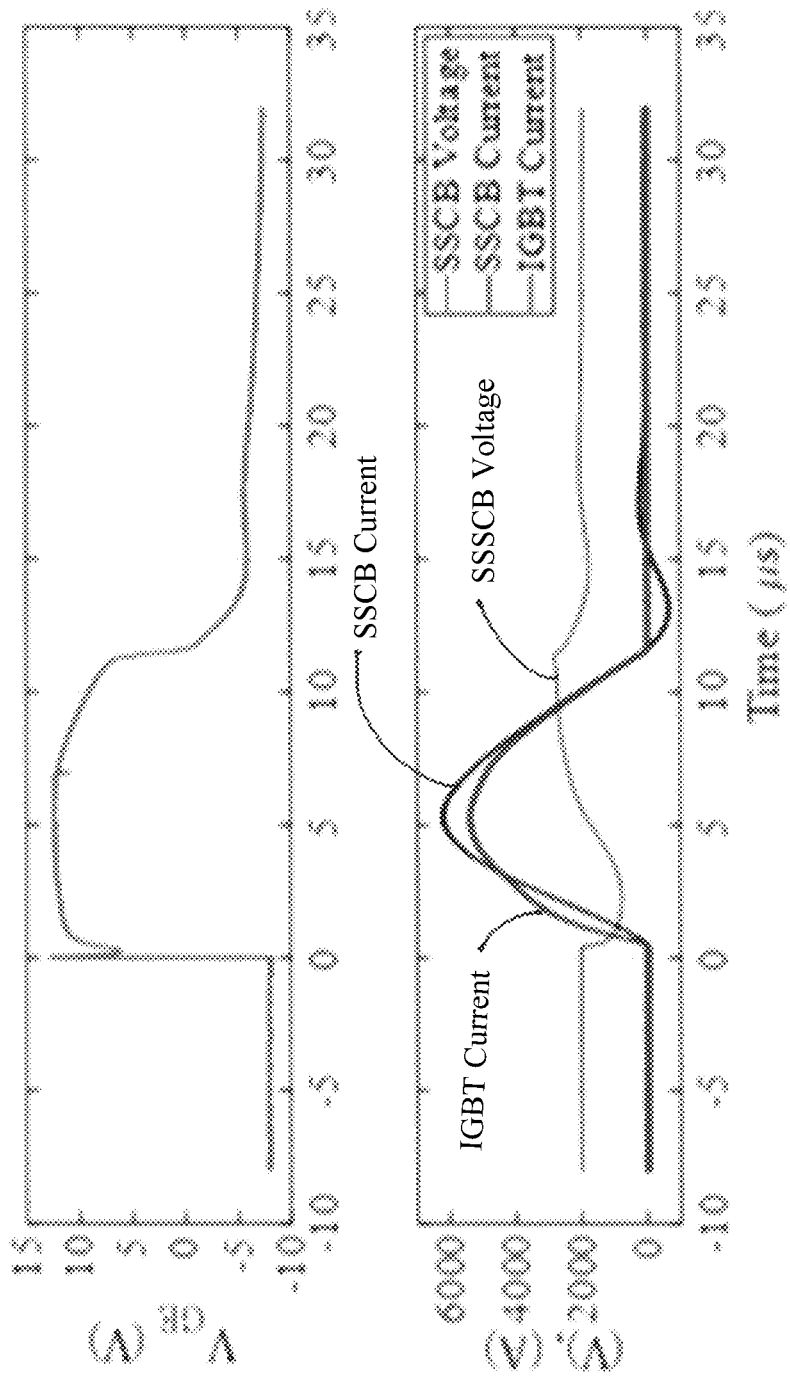
FIG. 20 shows Switching waveforms, where $L_{System}=0$ PH, $V_{DC}=2000$ V, $T_{Junction}$ is room temperature.
Figure 21:
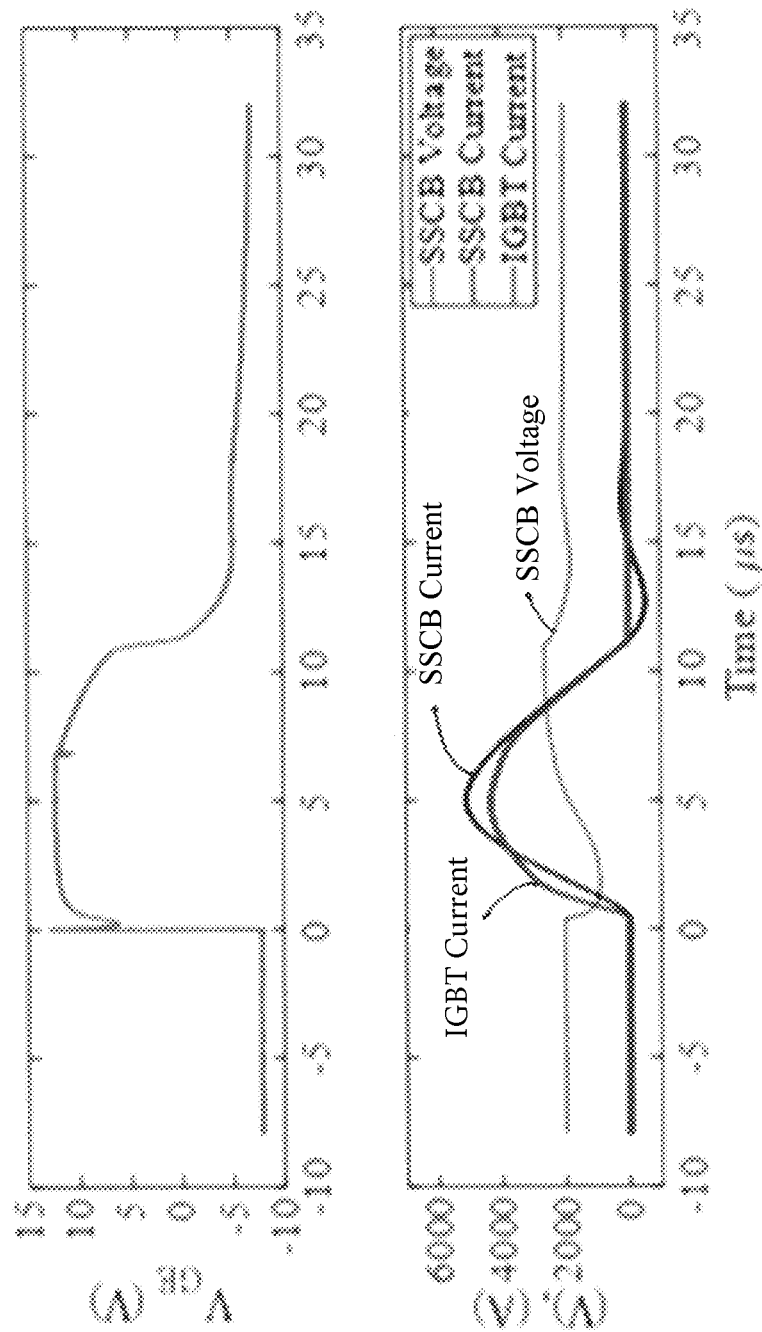
FIG. 21 shows Switching waveforms, where $L_{System}=0$ PH, $V_{DC}=2000$ V, $T_{Junction}=100°$ C.

FIG. 20 and FIG. 21 present the SSCB voltage and current waveforms during the interruption of a short circuit developed with minimum system impedance, with the air-core inductor shown in FIG. 12 bypassed. The system inductance is only 300 nH, mainly due to the power cabling. And the parasitic inductance inside SSCB is about 200 nH. Thus, the total inductance limiting the fault current is around 500 nH. As seen in these figures, the IGBT enters the current saturation mode shortly after the fault initiation and before the gate drive circuit detects the fault and responds to turn off the gate. The IGBT voltage stays well above zero during the short circuit. The initial ramping rate of the fault current is contained below 3 kA/μs. And the peak fault current flowing through the IGBT is effectively limited to 5 kA which consequently is interrupted after the protection circuitry is triggered. Such peak fault current is further reduced to 4 kA with higher junction temperature, which is closer to the real case.

V. CONCLUSION

Thus disclosure, and the exemplary embodiments described herein, provide a high-density solid-state circuit breaker without current limiting inductor. The disclosed SSCB can limit the maximum peak fault current level with reduced IGBT gate voltage, thus achieving a high specific power density for hybrid electric propulsion applications. The carefully chosen gate voltage effectively limits the IGBT saturation current with insignificant efficiency penalty. The impact of the inductor-less design on the SSCB mechanical layout, gate drive control and operational reliability is discussed in depth. Detailed design and analysis of the disclosed SSCB are presented.

Both the thermal and switching performances of the disclosed SSCB have been experimentally validated. The thermal test confirms that the efficiency penalty due to reduced gate voltage is extremely limited, and the specifications can be satisfied with a sufficient margin. Test results of both normal load current turn-off and short circuit clearing show satisfactory transient performance with switching trajectories well contained in the IGBT module's safe operating area (SOA). The experimental results prove the feasibility and effectiveness of the disclosed solution.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:
1. A solid state circuit breaker (SSCB) comprising:
   a first IGBT (Insulated Gate Bipolar Transistor), the first IGBT including an emitter, a collector, and a gate;
   a second IGBT that is anti-series to the first IGBT, the second IGBT including an emitter, a collector, and a gate;
   each IGBT including anti-parallel diodes to carry and break bi-directional currents; and a voltage clamping circuit or device to clamp the peak voltage across the first and second anti-series IGBTs,
wherein the first IGBT gate and the second IGBT gate are driven with a gate driver which applies a gate voltage to each gate which normally operates the IGBTs within the saturation region or turns the IGBTs off, and the applied gate voltage acts to limit the current thru the IGBT to the saturation current of the IGBT in the event the IGBT enters an active region during a current overload fault mode, the gate voltage applied enabling the IGBTs to operate as a solid state circuit breaker without a current limiting inductor.

2. The solid state circuit breaker (SSCB) according to claim 1, wherein the voltage clamping circuit is a MOV (metal-oxide varistor).

3. The solid state circuit breaker (SSCB) according to claim 1, further comprising:
an IGBT gate driver, the gate drive operatively connected to the first and second IGBT gates, and the gate driver operatively connected to a load current monitoring detection circuit or device, the IGBT configured to detect an overcurrent condition and in response to the detected overcurrent condition reducing the gate voltages applied to the first and second IGBT gates to turn the IGBTs off.

4. The solid state circuit breaker (SSCB) according to claim 1, wherein the IGBT gate voltage applied is in the range of 8V to 15V.

5. The solid state circuit breaker (SSCB) according to claim 1, wherein the gate voltage is selected to limit a peak current to the IGBT current saturation level independent from any fault response time associated with an over-current load condition.

6. The solid state circuit breaker (SSCB) according to claim 1, wherein the SSCB includes two IGBT modules connected back-to-back, an RC snubber limiting the transient voltage rise during IGBT turn-off and helping to mitigate the stress on the IGBT, and an electronically triggered MOV (eMOV), the eMOV reducing the peak clamping voltage inside the SSCB during fault clearing.

7. The solid state circuit breaker (SSCB) according to claim 6, wherein the eMOV includes a thyristor module and a MOV, wherein gates of the thyristor module are controlled by a passive circuit including breakover diodes (BOD allowing the use of a relatively MOV of lower clamping voltage without incurring excessive static dissipation during the SSCB off-state, thus optimizing the overall SSCB performance.

8. A solid state circuit breaker (SSCB) comprising:
a first SSCB and a second SSB, each SSCB configured to operatively connect to a distinct pole of a voltage source, and each SSBC including:
a first IGBT (Insulated Gate Bipolar Transistor), the first IGBT including an emitter, a collector, and a gate;
a second IGBT that is anti-series to the first IGBT, the second IGBT including an emitter, a collector, and a gate;
each IGBT including anti-parallel diodes to carry and break bi-directional currents; and
a voltage clamping circuit or device to clamp the peak voltage across the first and second anti-series IGBTs,
wherein the first IGBT gate and the second IGBT gate are driven with a gate driver which applies a gate voltage to each gate which normally operates the IGBTs within the saturation region or turns the IGBTs off, and the applied gate voltage acts to limit the current thru the IGBT to the saturation current of the IGBT in the event the IGBT enters an active region during a current overload fault mode, the gate voltage applied enabling the IGBTs to operate as a solid state circuit breaker without a current limiting inductor.

9. The solid state circuit breaker (SSCB) according to claim 8, wherein the voltage clamping circuit is a MOV (metal-oxide varistor).

10. The solid state circuit breaker (SSCB) according to claim 8, further comprising:
an IGBT gate driver, the gate drive operatively connected to the first and second IGBT gates, and the gate driver operatively connected to a load current monitoring detection circuit or device, the IGBT configured to detect an overcurrent condition and in response to the detected overcurrent condition reducing the gate voltages applied to the first and second IGBT gates to turn the IGBTs off.

11. The solid state circuit breaker (SSCB) according to claim 8, wherein the IGBT gate voltage applied is in the range of 8V to 15V.

12. The solid state circuit breaker (SSCB) according to claim 8, wherein the gate voltage is selected to limit a peak current to the IGBT current saturation level independent from any fault response time associated with an over-current load condition.

13. The solid state circuit breaker (SSCB) according to claim 8, wherein the SSCB includes two IGBT modules connected back-to-back, an RC snubber limiting the transient voltage rise during IGBT turn-off and helping to mitigate the stress on the IGBT, and an electronically triggered MOV (eMOV), the eMOV reducing the peak clamping voltage inside the SSCB during fault clearing.

14. The solid state circuit breaker (SSCB) according to claim 13, wherein the eMOV includes a thyristor module and a MOV, wherein gates of the thyristor module are controlled by a passive circuit including breakover diodes (BOD allowing the use of a relatively MOV of lower clamping voltage without incurring excessive static dissipation during the SSCB off-state, thus optimizing the overall SSCB performance.

15. A method of operating a solid state circuit breaker (SSCB) to provide current limiting without a current limiting inductor, the SSCB including a first IGBT (Insulated Gate Bipolar Transistor) and second anti-series IGBT, each IGBT including anti-parallel diodes to carry and break bi-directional currents; and a voltage clamping circuit or device to clamp the peak voltage across the first and second anti-series IGBTs, the method comprising:
applying to the first IGBT gate and the second IGBT a gate voltage which normally operates the IGBTs within the saturation region or turns the IGBTs off, and the applied gate voltage acting to limit the current thru the IGBT to the saturation current of the IGBT in the event the IGBT enters an active region during a current overload fault mode, the gate voltage applied enabling the IGBTs to operate as a solid state circuit breaker without a current limiting inductor.

16. The method of operating a solid state circuit breaker (SSCB) according to claim 15, further comprising:
detecting an overcurrent condition and in response to the detected overcurrent condition reducing the gate voltages applied to the first and second IGBT gates to turn the IGBTs off.

17. The method of operating a solid state circuit breaker (SSCB) according to claim 15, wherein the IGBT gate voltage applied is in the range of 8V to 15V.

18. The method of operating a solid state circuit breaker (SSCB) according to claim 15, wherein the gate voltage is selected to limit a peak current to the IGBT current saturation level independent from any fault response time associated with an over-current load condition.

19. The method of operating a solid state circuit breaker (SSCB) according to claim 15, wherein the SSCB includes two IGBT modules connected back-to-back, an RC snubber limiting the transient voltage rise during IGBT turn-off and helping to mitigate the stress on the IGBT, and an electronically triggered MOV (eMOV), the eMOV reducing the peak clamping voltage inside the SSCB during fault clearing.

20. The method of operating a solid state circuit breaker (SSCB) according to claim 19, wherein the eMOV includes a thyristor module and a MOV, wherein gates of the thyristor module are controlled by a passive circuit including break-over diodes (BOD allowing the use of a relatively MOV of lower clamping voltage without incurring excessive static dissipation during the SSCB off-state, thus optimizing the overall SSCB performance.

\* \* \* \* \*